(12) United States Patent
Kim et al.

(10) Patent No.: US 12,439,715 B2
(45) Date of Patent: Oct. 7, 2025

(54) IMAGE SENSOR PACKAGE AND SYSTEM HAVING THE SAME

(71) Applicant: Samsung Electronics Co., Ltd., Suwon-si (KR)

(72) Inventors: Sunjae Kim, Seoul (KR); Chungho Song, Suwon-si (KR); Yonghoe Cho, Cheonan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 658 days.

(21) Appl. No.: 17/728,275

(22) Filed: Apr. 25, 2022

(65) Prior Publication Data

US 2023/0085734 A1 Mar. 23, 2023

(30) Foreign Application Priority Data

Sep. 17, 2021 (KR) ........................ 10-2021-0125206

(51) Int. Cl.
*H10F 39/00* (2025.01)
*H01L 23/00* (2006.01)
(Continued)

(52) U.S. Cl.
CPC ........... *H10F 39/804* (2025.01); *H01L 24/05* (2013.01); *H01L 24/13* (2013.01); *H01L 24/16* (2013.01);
(Continued)

(58) Field of Classification Search
CPC .... H10F 39/804; H10F 39/811; H10F 39/182; H10F 39/8063; H10F 39/1865; H10F 10/161; H10F 19/75; H01L 24/05; H01L 24/13; H01L 24/16; H01L 24/26; H01L 24/29; H01L 24/33; H01L 24/73; H01L 24/81; H01L 24/92; H01L 24/97;
(Continued)

(56) References Cited

U.S. PATENT DOCUMENTS 9,773,826 B2 * 9/2017 Iwafuchi ............. H10F 39/8063
10,015,885 B2 7/2018 Jung et al.
(Continued)

FOREIGN PATENT DOCUMENTS

| KR | 101449006 B1 | 10/2014 |
| KR | 10-2018-0032914 A | 4/2018 |
| KR | 102252490 B1 | 5/2021 |

*Primary Examiner* — Jonathan Han
(74) *Attorney, Agent, or Firm* — Harness, Dickey & Pierce, P.L.C.

(57) ABSTRACT

An image sensor package includes: a package base substrate having a cavity extending inwards from an upper surface thereof, and including a plurality of upper surface connection pads and a plurality of lower surface connection pads; an image sensor chip in the cavity, and including a chip body having a first surface and a second surface facing each other, a sensor unit located in the first surface of the chip body, and a plurality of chip pads around the sensor unit; a filter glass above the image sensor chip, and including a transparent substrate and a plurality of redistribution patterns on a lower surface of the transparent substrate; and a plurality of connection terminals between the plurality of redistribution patterns and the plurality of chip pads and between the plurality of redistribution patterns and the plurality of upper surface connection pads.

18 Claims, 23 Drawing Sheets

(51) Int. Cl.
*H04N 23/51* (2023.01)
*H04N 23/54* (2023.01)
*H04N 23/55* (2023.01)
*H10F 39/18* (2025.01)

(52) U.S. Cl.
CPC ............ *H10F 39/811* (2025.01); *H01L 24/26* (2013.01); *H01L 24/29* (2013.01); *H01L 24/33* (2013.01); *H01L 24/73* (2013.01); *H01L 24/81* (2013.01); *H01L 24/92* (2013.01); *H01L 24/97* (2013.01); *H01L 2224/05571* (2013.01); *H01L 2224/05573* (2013.01); *H01L 2224/13005* (2013.01); *H01L 2224/13023* (2013.01); *H01L 2224/16227* (2013.01); *H01L 2224/26145* (2013.01); *H01L 2224/2919* (2013.01); *H01L 2224/33181* (2013.01); *H01L 2224/33183* (2013.01); *H01L 2224/73153* (2013.01); *H01L 2224/73204* (2013.01); *H01L 2224/81191* (2013.01); *H01L 2224/92125* (2013.01); *H01L 2224/92143* (2013.01); *H01L 2224/97* (2013.01); *H04N 23/51* (2023.01); *H04N 23/54* (2023.01); *H04N 23/55* (2023.01); *H10F 39/182* (2025.01); *H10F 39/8063* (2025.01)

(58) Field of Classification Search
CPC . H01L 2224/05571; H01L 2224/05573; H01L 2224/13005; H01L 2224/13023; H01L 2224/16227; H01L 2224/26145; H01L 2224/2919; H01L 2224/33181; H01L 2224/33183; H01L 2224/73153; H01L 2224/73204; H01L 2224/81191; H01L 2224/92125; H01L 2224/92143; H01L 2224/97; H01L 27/14618; H01L 27/14636; H01L 27/14621; H01L 27/14627; H01L 23/5383; H01L 23/13; H01L 23/31; H01L 23/481; H01L 23/485; H01L 23/49827; H01L 23/525; H01L 23/5384; H01L 27/14665; H01L 25/0657; H04N 23/51; H04N 23/54; H04N 23/55; A61K 40/4232

See application file for complete search history.

(56) References Cited

U.S. PATENT DOCUMENTS

| | | | |
|---|---|---|---|
| 10,964,615 | B2 | 3/2021 | Hung et al. |
| 10,998,361 | B2 | 5/2021 | Lin et al. |
| 10,998,362 | B2 | 5/2021 | Lim et al. |
| 2015/0255500 | A1* | 9/2015 | Akahoshi .......... H01L 27/14618 257/434 |
| 2019/0181172 | A1 | 6/2019 | Kim et al. |
| 2020/0013814 | A1* | 1/2020 | Jeong ................. H10F 39/8063 |
| 2020/0203408 | A1 | 6/2020 | Nagata et al. |
| 2021/0313367 | A1* | 10/2021 | Hatano .................. H10F 77/60 |

* cited by examiner

IMAGE SENSOR PACKAGE AND SYSTEM HAVING THE SAME

CROSS-REFERENCE TO RELATED APPLICATION

This application is based on and claims priority under 35 U.S.C. § 119 to Korean Patent Application No. 10-2021-0125206, filed on Sep. 17, 2021, in the Korean Intellectual Property Office, the disclosure of which is incorporated by reference herein in its entirety.

BACKGROUND

The inventive concepts relate to an image sensor package including an image sensor chip, and/or a system including the image sensor package.

Image sensor packages have been used as core parts in a wide variety of fields, such as portable terminals such as portable phones and tablets, and vehicles, in addition to cameras. Image sensor packages may have various types of package structures, such as a chip on board (COB) package, a chip on flexible (COF) printed circuit board (PCB) package, a chip on glass (COG) package, a wafer level chip scale package (WLCSP), an image sensor ball grid array (IBGA) package, and a plastic leadless chip carrier (PLCC) package, according to mounted systems. In particular, image sensor packages used in cameras may be formed to have package structures of image sensor chip scale packages (ICSPs).

SUMMARY

The inventive concepts provide an image sensor package having a reduced form factor and a simplified manufacturing process, and/or a system including the same.

In some example embodiments, there is provided an image sensor package including: a package base substrate having a cavity that extends inwards from an upper surface thereof, and including a plurality of upper surface connection pads and a plurality of lower surface connection pads electrically connected to each other; an image sensor chip in the cavity, and the image sensor chip including a chip body having a first surface and a second surface that face away from each other, a sensor unit in the first surface of the chip body, and a plurality of chip pads around the sensor unit in the first surface of the chip body; a filter glass above the image sensor chip, and the filter glass including a transparent substrate and a plurality of redistribution patterns on a lower surface of the transparent substrate; and a plurality of connection terminals arranged between the plurality of redistribution patterns and the plurality of chip pads and between the plurality of redistribution patterns and the plurality of upper surface connection pads to electrically connect the plurality of chip pads to the plurality of upper surface connection pads.

In some example embodiments, there is provided an image sensor package including: a package base substrate having a cavity in an upper surface thereof, and including a plurality of upper surface connection pads and a plurality of lower surface connection pads electrically connected to each other; an image sensor chip in the cavity, and the image sensor chip including a chip body having a first surface and a second surface that face away from each other, a sensor unit located in the first surface of the chip body, and a plurality of chip pads around the sensor unit in the first surface of the chip body; a filter glass above the image sensor chip, and the filter glass including a transparent substrate and a plurality of redistribution patterns, and the plurality of redistribution patterns on a lower surface of the transparent substrate, planarly adjacent to an edge of the transparent substrate, and that extend from an inward location to an outward location; a plurality of inner connection terminals between the plurality of redistribution patterns and the plurality of chip pads; a plurality of outer connection terminals between the plurality of redistribution patterns and the plurality of upper surface connection pads; a dam structure between the chip body and the transparent substrate; and an encapsulant configured to fill a space between the package base substrate and the filter glass, planarly on the outside of the dam structure, and surround the plurality of inner connection terminals and the plurality of outer connection terminals, wherein the image sensor chip is electrically connected to the plurality of lower surface connection pads via the plurality of chip pads, the plurality of inner connection terminals, the plurality of redistribution patterns, the plurality of outer connection terminals, and the plurality of upper surface connection pads.

In some example embodiments, there is provided a system including an image sensor package, including: a housing having a light incidence opening; a system board within the housing; an image sensor package attached onto the system board within the housing; and an optical unit coupled to the light incidence opening of the housing, and including a barrel and at least one lens supported by the barrel, wherein the image sensor package includes: a package base substrate including a plurality of upper surface connection pads and a plurality of lower surface connection pads electrically connected to each other, and the package base substrate having a cavity that extends inwards from an upper surface thereof; an image sensor chip in the cavity, and the image sensor chip including a chip body having a first surface and a second surface that face away from each other, a sensor unit in the first surface of the chip body, and a plurality of chip pads around the sensor unit in the first surface of the chip body; a filter glass including a transparent substrate, a light shielding film that covers a portion of an upper surface of the transparent substrate, and a plurality of redistribution patterns on a lower surface of the transparent substrate, each of the plurality of redistribution patterns including an inner pad, an outer pad, and a connection line that connects the inner pad to the outer pad, planarly adjacent to an edge of the transparent substrate, and extends from the inside to the outside, wherein the inner pad, the outer pad, and the connection line form an integral body; a plurality of inner connection terminals between the inner pads of the plurality of redistribution patterns and the plurality of chip pads; a plurality of outer connection terminals between the outer pads of the plurality of redistribution patterns and the plurality of upper surface connection pads; a dam structure between the chip body and the transparent substrate, that continuously extends planarly between the sensor unit and the plurality of chip pads, and fully surrounds the sensor unit; and an encapsulant that surrounds the plurality of inner connection terminals and the plurality of outer connection terminals, fills the cavity and a space between the package base substrate and the filter glass, planarly on the outside of the dam structure, and not within an inner space defined by the dam structure, the image sensor chip, and the filter glass.

BRIEF DESCRIPTION OF THE DRAWINGS

Embodiments of the inventive concepts will be more clearly understood from the following detailed description taken in conjunction with the accompanying drawings in which.

DETAILED DESCRIPTION OF THE EMBODIMENTS

Example embodiments will now be described more fully with reference to the accompanying drawings.

Figure 1A:
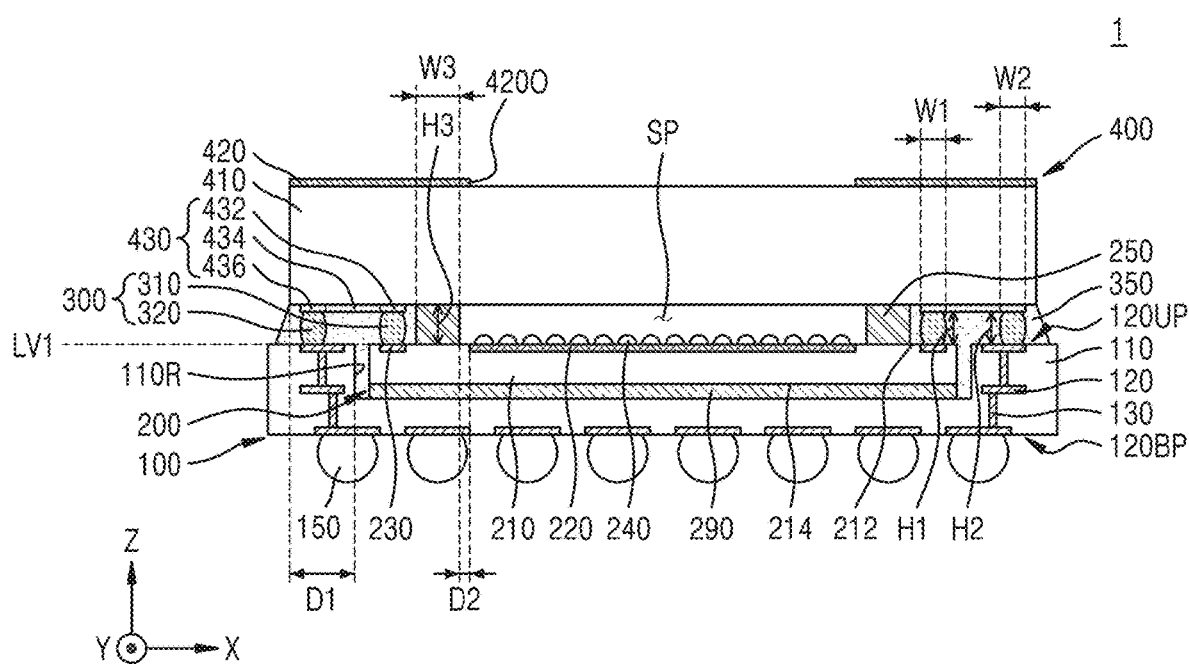
FIG. 1A is a cross-sectional view of an image sensor package according to one or more embodiments.
Figure 1B:
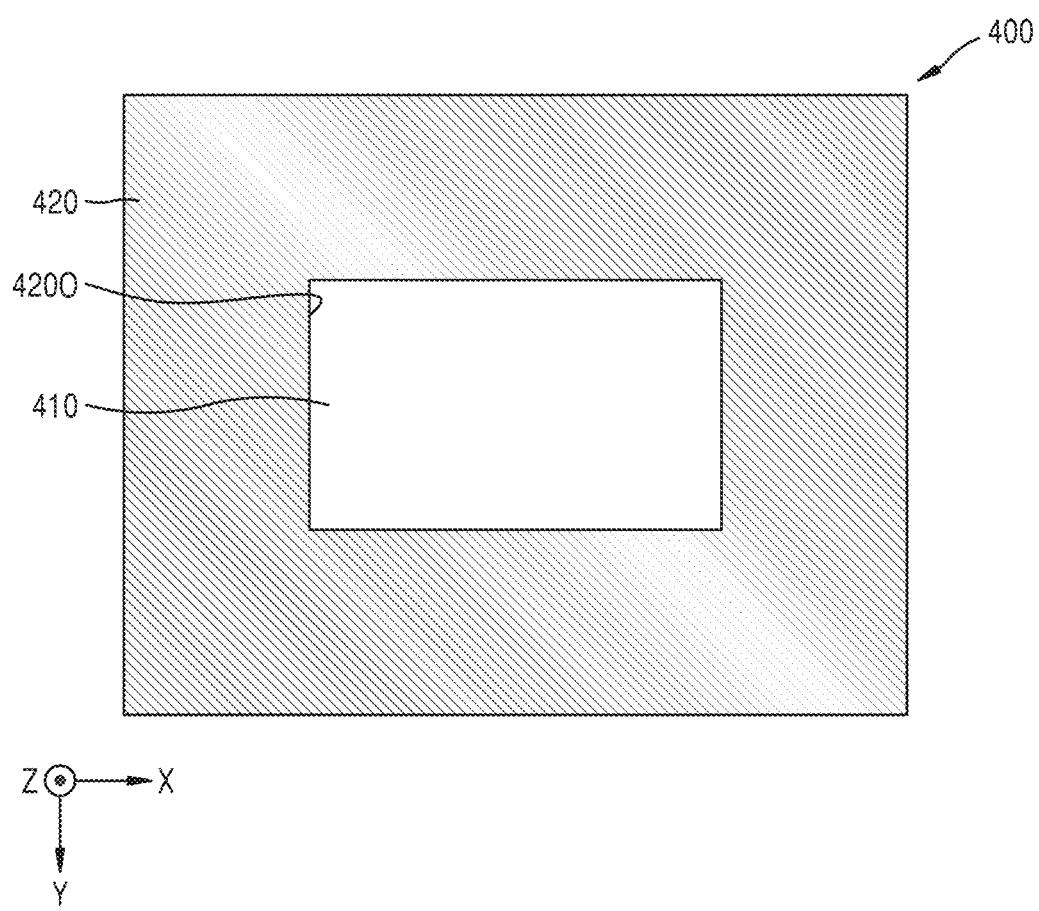
FIGS. 1B and 1C are plan views respectively illustrating an upper surface and a lower surface of a filter glass included in the image sensor package, according to one or more embodiments.
Figure 1C:
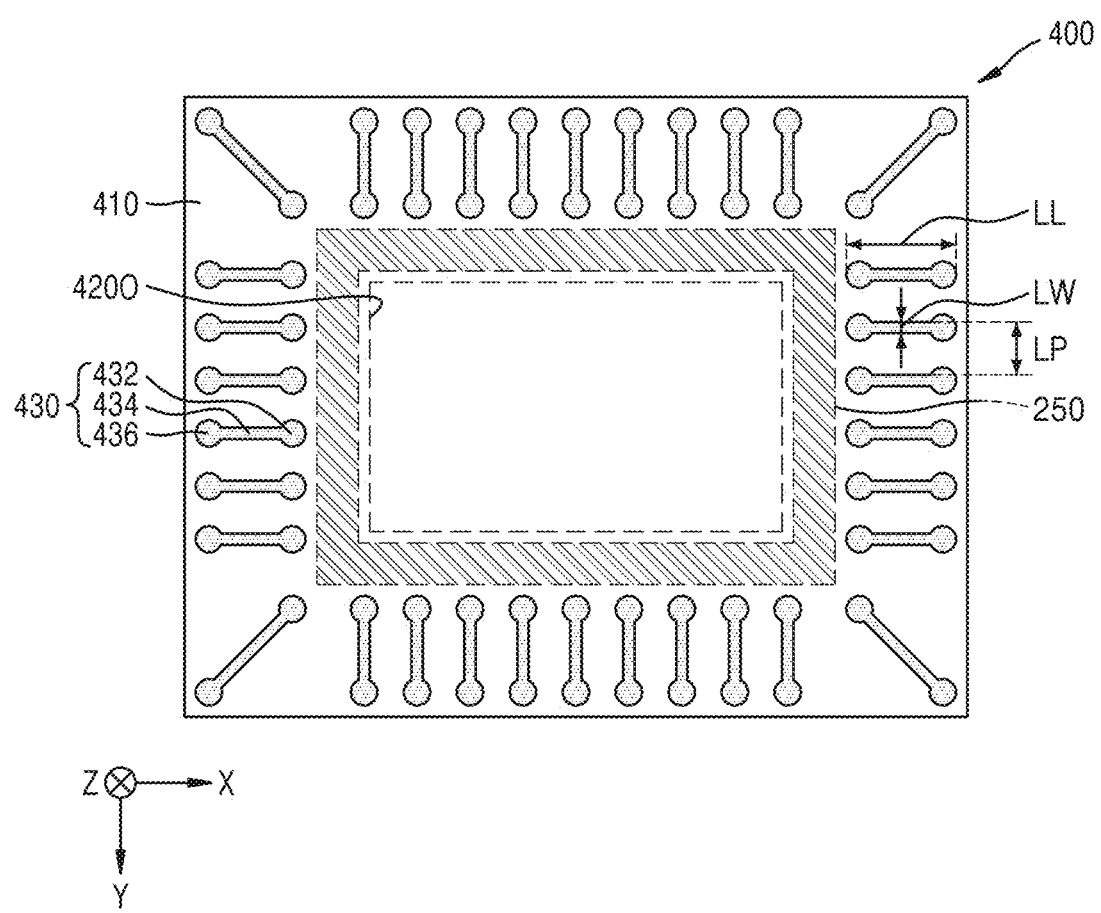

FIG. 1A is a cross-sectional view of an image sensor package according to one or more embodiments. FIGS. 1B and 1C are plan views respectively illustrating an upper surface and a lower surface of a filter glass included in the image sensor package, according to one or more embodiments.

Referring to FIGS. 1A through 1C together, an image sensor package 1 may include a package base substrate 100, an image sensor chip 200, and a filter glass 400.

The package base substrate 100 may be, for example, a printed circuit board. In some embodiments, the package base substrate 100 may be a multilayer printed circuit board. The package base substrate 100 may include a base layer 110, a plurality of conductive patterns 120, and a plurality of conductive vias 130.

The base layer 110 may be formed of at least one material selected from a phenol resin, an epoxy resin, and polyimide. For example, the base layer 110 may include at least one material selected from Flame Retardant 4 (FR4), tetrafunctional epoxy, polyphenylene ether, epoxy/polyphenylene oxide, bismaleimide triazine (BT), thermount, cyanate ester, polyimide, and liquid crystal polymer, but example embodiments are not limited thereto. In some embodiments, the base layer 110 may include a plurality of stacked sub-base layers.

The plurality of conductive patterns 120 may be arranged on an upper surface and a lower surface of the base layer 110, or may be arranged on the upper surface and the lower surface of the base layer 110 and inside the base layer 110 and extend in a horizontal direction. For example, when the base layer 110 includes the plurality of stacked sub-base layers, the plurality of conductive patterns 120 may be arranged on an upper surface and a lower surface of each of the plurality of stacked sub-base layers and extend in the horizontal direction. From among the plurality of conductive patterns 120, the conductive patterns 120 arranged on the upper surface of the base layer 110 and exposed on an upper surface of the package base substrate 100 may be referred to as upper surface connection pads 120UP, and the conductive patterns 120 arranged on the lower surface of the base layer 110 and exposed on a lower surface of the package base substrate 100 may be referred to as lower surface connection pads 120BP. A plurality of upper surface connection pads 120UP and a plurality of lower surface connection pads 120BP may be electrically connected to the rest of the plurality of conductive patterns 120 through the plurality of conductive vias 130.

In some embodiments, the package base substrate 100 may further include a solder resist layer that does not cover but exposes the plurality of upper surface connection pads 120UP and the plurality of lower surface connection pads 120BP, and covers the upper surface and the lower surface of the base layer 110. For example, the plurality of upper surface connection pads 120UP and the plurality of lower surface connection pads 120BP may be portions of the plurality of conductive patterns 120 that are arranged on the upper surface and the lower surface of the base layer 110, and are not covered by the solder resist layer.

The plurality of conductive vias 130 may pass through a portion of the base layer 110 and extend in a vertical direction to electrically connect the conductive patterns 120 located at different vertical levels. For example, when the base layer 110 includes the plurality of stacked sub-base layers, the plurality of conductive vias 130 may pass through at least one sub-base layer of the plurality of stacked sub-base layers and extend in the vertical direction to electrically connect the conductive patterns 120 located at different vertical levels.

The plurality of conductive patterns 120 may be formed of, for example, electrolytically deposited (ED) copper foil, rolled-annealed (RA) copper foil, stainless steel foil, aluminum foil, ultra-thin copper foil, sputtered copper, copper alloys, or the like. The plurality of conductive vias 130 may be formed of, for example, copper, nickel, stainless steel, or beryllium copper, but example embodiments are not limited thereto.

The package base substrate 100 may have a cavity 110R in which the image sensor chip 200 may be accommodated. The base layer 110 may be exposed on a bottom surface and an inner side of the cavity 110R. The cavity 110R may be planarly arranged near the center of the package base substrate 100 to be spaced apart from outer sides of the package base substrate 100. For example, the cavity 110R may be formed by planarly removing a central portion of an upper portion of the base layer 110. The cavity 110R may extend inwards from a first vertical level LV1 at which the upper surface of the package base substrate 100 is located, and may not extend to the lower surface of the package base substrate 100 not to pass through the package base substrate 100. In other words, the bottom surface of the cavity 110R may be located at a higher vertical level than the lower surface of the package base substrate 100.

The image sensor chip 200 may be arranged within the cavity 110R of the package base substrate 100. A horizontal cross-sectional area of the cavity 110R may be greater than a horizontal cross-sectional area of the image sensor chip 200. The image sensor chip 200 may be arranged within the cavity 110R to be spaced apart from the inner side of the cavity 110R of the package base substrate 100. A depth of the cavity 110R may be substantially similar to or slightly greater than a thickness of the image sensor chip 200.

The image sensor chip 200 may include a chip body 210, a sensor unit 220, and a plurality of chip pads 230. The chip body 210 may have a first surface 212 and a second surface 214 facing each other. The image sensor chip 200 may be attached onto the bottom surface of the cavity 110R of the package base substrate 100 via a chip adhesive member 290 attached to the second surface 214 of the chip body 210. The chip adhesive member 290 may include, for example, a die attach film. For example, the image sensor chip 200 may include a CMOS image sensor (CIS) or a charge-coupled device (CCD).

The chip body 210 may include a substrate. The substrate may include, for example, a silicone bulk wafer, an epitaxial wafer, or the like. The epitaxial wafer may include a crystalline material layer grown on a bulk substrate via an epitaxial process, i.e., an epitaxial layer. However, the substrate is not limited to a bulk wafer or an epitaxial wafer, and may include various types of wafers such as a polished wafer, an annealed wafer, and a silicon on insulator (SOI) wafer.

The sensor unit 220 may be located in the first surface 212 of the chip body 210. The sensor unit 220 may be planarly arranged at a central portion of the image sensor chip 200. The first surface 212 of the chip body 210 may include an outer region around the sensor unit 220, and the outer region may surround the sensor unit 220.

The sensor unit 220 may include a pixel array including a plurality of unit pixels. The plurality of unit pixels may be arranged in a two-dimensional array in the first surface 212 of the chip body 210. The plurality of unit pixels may be, for example, a passive pixel sensor or an active pixel sensor. Each of the plurality of unit pixels may absorb incident light, generate a charge corresponding to an amount of the light, accumulate the generated charge, and externally transmit the accumulated charge. The plurality of unit pixels may respectively include a photodiode that senses light, a transfer transistor that transfers a charge generated by the photodiode, a floating diffusion region that stores the transferred charge, a reset transistor that periodically resets the floating diffusion region, and a source follower that buffers a signal according to the charge stored in the floating diffusion region.

A plurality of microlenses 240 respectively corresponding to the plurality of unit pixels may be arranged on the sensor unit 220. A plurality of color filters may be arranged between the sensor unit 220 and the plurality of microlenses 240. The plurality of color filters may include, for example, a red (R) filter, a blue (B) filter, and a green (G) filter. Alternatively, the plurality of color filters may include a cyan (C) filter, a yellow (Y) filter, and a magenta (M) filter. The color filter including one of a R filter, a B filter, and a G filter, or one of a C filter, a Y filter, and a M filter may be arranged on each of the plurality of unit pixels. The plurality of unit pixels may recognize one color by detecting components of respectively split incident light beams. The plurality of microlenses 240 may focus light incident on the sensor unit 220 on the plurality of unit pixels.

The plurality of chip pads 230 may be arranged in the first surface 212 of the chip body 210. For example, the chip pads 230 may be arranged around the sensor unit 220, i.e., in a peripheral region of the first surface 212 of the chip body 210. The plurality of chip pads 230 may be electrically and respectively connected to the plurality of unit pixels of the sensor unit 220. The plurality of chip pads 230 may include metals, such as copper (Cu), aluminum (Al), tungsten (W), titanium (Ti), tantalum (Ta), indium (In), molybdenum (Mo), manganese (Mn), cobalt (Co), tin (Sn), nickel (Ni), magnesium (Mg), rhenium (Re), beryllium (Be), gallium (Ga), and ruthenium (Ru), or combinations thereof, but example embodiments are not limited thereto.

In some embodiments, the upper surface of the package base substrate 100 and the first surface 212 of the chip body 210 may be located at a substantially same vertical level, i.e., the first vertical level LV1. For example, the plurality of microlenses 240 may have a shape protruding upwards from the first vertical level LV1. Upper surfaces of the plurality of upper surface connection pads 120UP and upper surfaces of the plurality of chip pads 230 may be located at a substantially same vertical level. In some embodiments, when the plurality of upper surface connection pads 120UP and the plurality of chip pads 230 are buried pads that are buried in the base layer 110 and the chip body 210 and only have exposed upper surfaces, the upper surfaces of the plurality of upper surface connection pads 120UP and the upper surfaces of the plurality of chip pads 230 may be located at the first vertical level LV1. In other embodiments, when the plurality of upper surface connection pads 120UP and the plurality of chip pads 230 protrude upwards from the base layer 110 and the chip body 210, the upper surfaces of the plurality of upper surface connection pads 120UP and the upper surfaces of the plurality of chip pads 230 may be located at a higher vertical level than the first vertical level LV1.

A dam structure 250 may be arranged on an outer region of the image sensor chip 200. The dam structure 250 may be arranged between the image sensor chip 200 and the filter glass 400 to maintain a distance between the image sensor chip 200 and the filter glass 400. The dam structure 250 may be arranged between a transparent substrate 410 and the chip body 210. For example, an upper surface and a lower surface of the dam structure 250 may be in contact with a lower surface of the transparent substrate 410 and an upper surface of the chip body 210. The dam structure 250 may be arranged on the first surface 212 of the chip body 210 not to cover the sensor unit 220 and the plurality of chip pads 230 of the image sensor chip 200. For example, the dam structure 250 may be arranged between the sensor unit 220 and the plurality of chip pads 230. The dam structure 250 may entirely surround the sensor unit 220 in a planar manner. For example, the dam structure 250 may have a rectangular ring shape continuously extending along an edge of the sensor unit 220, planarly between the sensor unit 220 and the plurality of chip pads 230. The dam structure 250 may be formed of polyimide, epoxy, or glue, but is not limited thereto. In some embodiments, the dam structure 250 may include a light absorbent material configured to absorb light incident on the dam structure 250.

The filter glass 400 may be arranged above the image sensor chip 200. The filter glass 400 may be arranged on the dam structure 250 formed on the first surface 212 of the chip body 210. Accordingly, the filter glass 400 may be vertically spaced apart from the image sensor chip 200 by a height of the dam structure 250, and an inner space SP may be formed between the filter glass 400 and the image sensor chip 200. The inner space SP may be defined by the image sensor chip 200, the dam structure 250, and the filter glass 400. The image sensor chip 200, the dam structure 250, and the filter glass 400 may seal the inner space SP to reduce or prevent moisture or foreign materials from permeating into the inner space SP from the outside, thereby reducing or preventing the image sensor chip 200, in particular, the sensor unit 220 and the plurality of microlenses 240, from being contaminated.

A horizontal width of the filter glass 400 may be greater than a horizontal width of the cavity 110R. The cavity 110R may completely overlap the filter glass 400 in the vertical direction. An edge of the cavity 110R may be planarly spaced apart from an edge of the filter glass 400 by a first distance D1. For example, the first distance D1 may be about 300 μm to about 700 m. The dam structure 250 may be spaced apart from the sensor unit 220 by a second distance D2 in the horizontal direction. For example, the second distance D2 may be about 100 μm to about 300 μm.

The filter glass 400 may include the transparent substrate 410, a light shielding film 420 arranged on an upper surface of the transparent substrate 410, and a plurality of redistribution patterns 430 arranged on the lower surface of the transparent substrate 410.

The transparent substrate 410 may include a material having a high light transmittance. The transparent substrate 410 may include, for example, glass or polymer. The transparent substrate 410 may pass or cut off light having a particular wavelength band. For example, the transparent substrate 410 may pass visible light or cut off infrared light. In some embodiments, the transparent substrate 410 may be an infrared cut-off filter, i.e., an IR filter. For example, the transparent substrate 410 may include a coating layer having a function of cutting off infrared light, or may include particles having a function of cutting off infrared light.

The light shielding film 420 may cover a portion of the upper surface of the transparent substrate 410. The light shielding film 420 may include, for example, chromium. The light shielding film 420 may have an opening 420O to cover an edge portion of the upper surface of the transparent substrate 410 and not to cover a central portion of the upper surface of the transparent substrate 410. The light shielding film 420 may not overlap the sensor unit 220 in the vertical direction. The light shielding film 420 may overlap the plurality of redistribution patterns 430, the plurality of upper surface connection pads 120UP, and the plurality of chip pads 230 in the vertical direction. In some embodiments, the light shielding film 420 may overlap the dam structure 250 in the vertical direction. An edge of the opening 420O of the light shielding film 420 may be between the sensor unit 220 and the dam structure 250 in the vertical direction. The light shielding film 420 may allow light incident toward the filter glass 400 to pass through the transparent substrate 410 and reach the sensor unit 220, but may prevent or mitigate the light from reaching the outside of the dam structure 250 on the first surface 212 of the chip body 210.

The plurality of redistribution patterns 430 may be planarly adjacent to an edge of the transparent substrate 410 and extend from the inside to the outside. The plurality of redistribution patterns 430 may each include an inner pad 432, an outer pad 436, and a connection line 434 connecting the inner pad 432 to the outer pad 436. The inner pad 432, the connection line 434, and the outer pad 436 included in each of the plurality of redistribution patterns 430 may form an integral body. An inner one end portion of each of the plurality of redistribution patterns 430 may be the inner pad 432, the outer other end portion thereof may be the outer pad 436, and a portion extending from the inner pad 432 to the outer pad 436 may be the connection line 434. Each of the plurality of redistribution patterns 430 may be, for example, a metal such as copper (Cu), aluminum (Al), tungsten (W), titanium (Ti), tantalum (Ta), indium (In), molybdenum (Mo), manganese (Mn), cobalt (Co), tin (Sn), nickel (Ni), magnesium (Mg), rhenium (Re), beryllium (Be), gallium (Ga), or ruthenium (Ru), or an alloy thereof, but is not limited thereto. In some embodiments, each of the plurality of redistribution patterns 430 may be formed by stacking a metal or a metal alloy on a seed layer including titanium, titanium nitride, or titanium tungsten. The plurality of redistribution patterns 430 may each have an extension length LL of about 200 m to about 500 μm from the inner pad 432 to the outer pad 436, and may be arranged with a pitch LP of about 70 μm to about 150 μm. The plurality of redistribution patterns 430 may each have a thickness of, for example, about 10 μm to about 25 μm. The connection line 434 may extend with a line width LW of about 30 μm to about 70 μm. A horizontal width and a horizontal area of the inner pad 432 may be substantially the same as those of the outer pad 436. The horizontal width of each of the inner pad 432 and the outer pad 436 may be greater than the line width LW of the connection line 434.

The package base substrate 100 and the image sensor chip 200 may be electrically connected to each other via a plurality of connection terminals 300 and the plurality of redistribution patterns 430. The plurality of connection terminals 300 may be, for example, solder balls or bumps. The plurality of connection terminals 300 may include a plurality of inner connection terminals 310 and a plurality of outer connection terminals 320. The inner pad 432 may have at least a portion overlapping the chip pad 230 corresponding thereto in the vertical direction, and the outer pad 436 may have at least a portion overlapping the upper surface connection pad 120UP corresponding thereto in the vertical direction. The inner connection terminal 310 may be arranged between the inner pad 432 and the chip pad 230 corresponding to each other, and the outer connection terminal 320 may be arranged between the outer pad 436 and the upper surface connection pad 120UP corresponding to each other.

The inner connection terminal 310 may have a first horizontal width W1 and a first vertical height H1, and the outer connection terminal 320 may have a second horizontal width W2 and a second vertical height H2. In some embodiments, the first horizontal width W1 and the second horizontal width W2 may be substantially the same, and the first vertical height H1 and the second vertical height H2 may be substantially the same. For example, the first horizontal width W1 and the second horizontal width W2 may each be about 20 μm to about 80 μm, and the first vertical height H1 and the second vertical height H2 may each be about 20 μm to about 80 μm.

An encapsulant 350 may be between the package base substrate 100 and the filter glass 400. The encapsulant 350 may include, for example, an epoxy-group molding resin, a polyimide-group molding resin, or the like. For example, the encapsulant 350 may include an epoxy molding compound (EMC). The encapsulant 350 may fill the outside of the dam structure 250, between the package base substrate 100 and the filter glass 400 in the horizontal direction. The encapsulant 350 may be formed only on the outside of the dam structure 250 not to fill the inner space SP inside the dam structure 250. The encapsulant 350 may fill a remaining portion of the cavity 110R that is not filled by the image sensor chip 200, i.e., a space between the image sensor chip 200 and the inner side of the cavity 110R, and may surround the plurality of inner connection terminals 310 and the plurality of outer connection terminals 320. The dam structure 250 may have a third horizontal width W3 in a direction between an inner side and an outer side of the dam structure 250, and may have a third vertical height H3. The third horizontal width W3 may be about 100 μm to about 200 μm, and the third vertical height H3 may be about 30 μm to about 150 μm.

The plurality of chip pads 230 of the image sensor chip 200 may be electrically and respectively connected to the plurality of upper surface connection pads 120UP of the package base substrate 100 via the plurality of inner connection terminals 310, the plurality of redistribution patterns 430 including the inner pads 432, the connection lines 434, and the outer pads 436, respectively, and the plurality of outer connection terminals 320.

A plurality of external connection terminals 150 may be respectively attached to the plurality of lower surface connection pads 120BP of the package base substrate 100. The plurality of external connection terminals 150 may be solder balls. The image sensor chip 200 may be electrically connected to the outside via the plurality of external connection terminals 150. For example, the plurality of external connection terminals 150 may electrically connect the image sensor package 1 to a system board.

In the image sensor package 1 according to the one or more embodiments, the image sensor chip 200 may be arranged within the cavity 110R of the package base substrate 100, and thus, the thickness of the image sensor package 1 may be made least, thereby reducing a form factor. Also, the image sensor chip 200 and the package base substrate 100 may be electrically connected to each other via the plurality of redistribution patterns 430 formed on the lower surface of the filter glass 400 and the plurality of connection terminals 300. Therefore, the electrical connection between the image sensor chip 200 and the package base substrate 100 may be simplified, and accordingly, a manufacturing cost may be reduced.

Figure 2A:
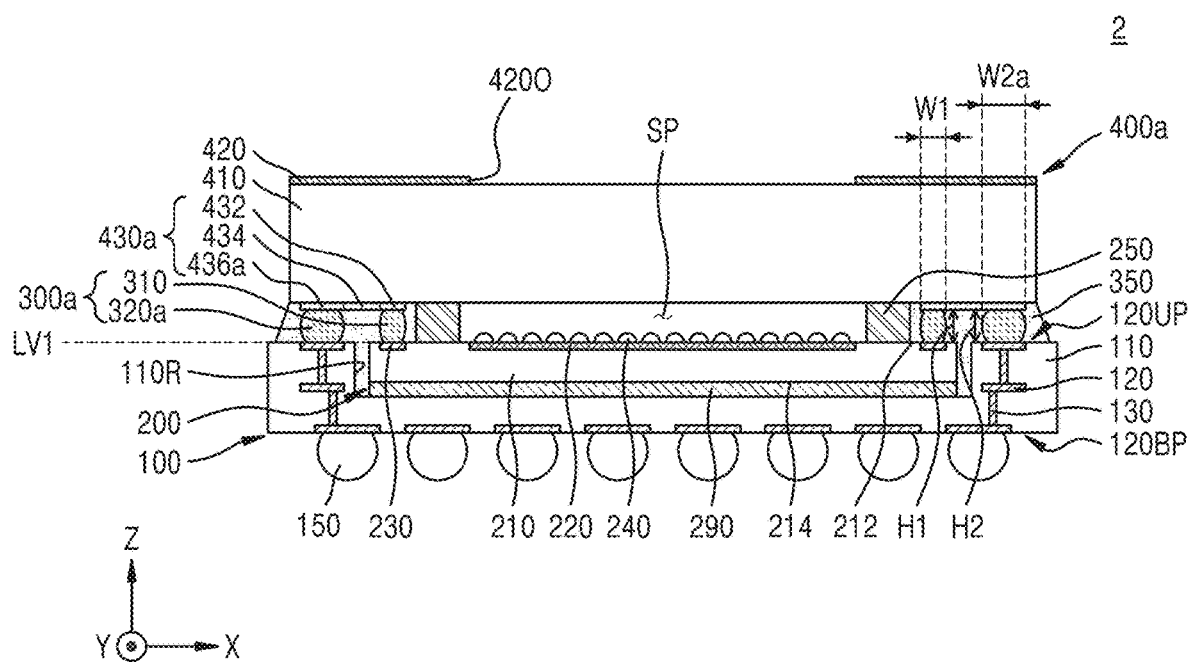
FIG. 2A is a cross-sectional view of an image sensor package according to one or more embodiments.
Figure 2B:
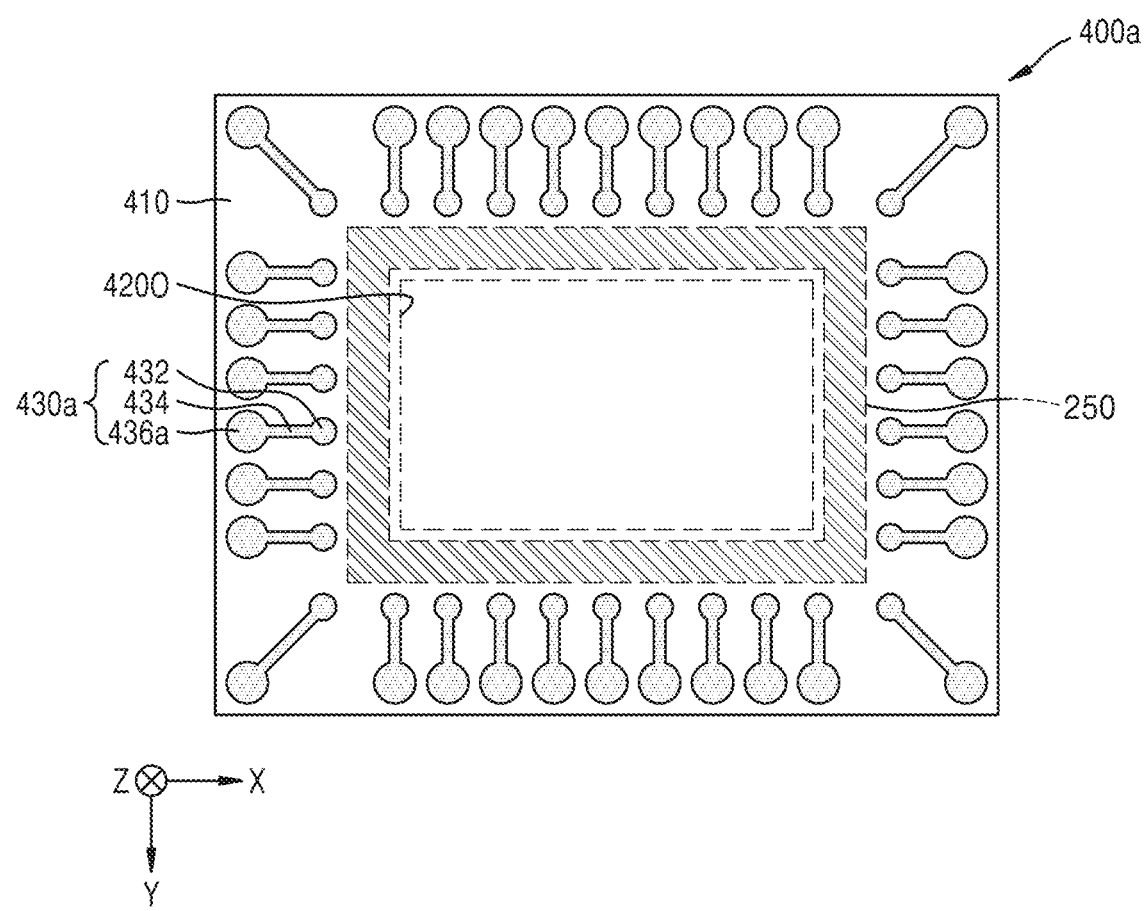
FIG. 2B is a plan view illustrating a lower surface of a filter glass included in an image sensor package, according to one or more embodiments.

FIG. 2A is a cross-sectional view of an image sensor package according to one or more embodiments. FIG. 2B is a plan view illustrating a lower surface of a filter glass included in an image sensor package, according to one or more embodiments. The same reference numerals in FIGS. 2A and 2B as those in FIGS. 1A through 1C denote the same or similar elements, and thus, a repeated description thereof may be omitted herein.

Referring to FIGS. 2A and 2B together, an image sensor package 2 may include a package base substrate 100, an image sensor chip 200, and a filter glass 400a.

The package base substrate 100 may include a base layer 110, a plurality of conductive patterns 120, and a plurality of conductive vias 130. From among the plurality of conductive patterns 120, the conductive patterns 120 arranged on an upper surface of the base layer 110 and exposed on an upper surface of the package base substrate 100 may be referred to as upper surface connection pads 120UP, and the conductive patterns 120 arranged on a lower surface of the base layer 110 and exposed on a lower surface of the package base substrate 100 may be referred to as lower surface connection pads 120BP.

The package base substrate 100 may have a cavity 110R in which the image sensor chip 200 may be accommodated. The base layer 110 may be exposed on a bottom surface and an inner side of the cavity 110R. The cavity 110R may be planarly arranged near the center of the package base substrate 100 to be spaced apart from outer sides of the package base substrate 100. The bottom surface of the cavity 110R may be located at a higher vertical level than the lower surface of the package base substrate 100.

The image sensor chip 200 may be arranged within the cavity 110R of the package base substrate 100. A horizontal cross-sectional area of the cavity 110R may be greater than a horizontal cross-sectional area of the image sensor chip 200. The image sensor chip 200 may be arranged within the cavity 110R to be spaced apart from the inner side of the cavity 110R of the package base substrate 100.

The image sensor chip 200 may include a chip body 210, a sensor unit 220, and a plurality of chip pads 230. The chip body 210 may have a first surface 212 and a second surface 214 facing each other. The image sensor chip 200 may be attached onto the bottom surface of the cavity 110R of the package base substrate 100 via a chip adhesive member 290 attached to the second surface 214 of the chip body 210.

The sensor unit 220 may be located in the first surface 212 of the chip body 210. The sensor unit 220 may be planarly arranged at a central portion of the image sensor chip 200. A plurality of microlenses 240 corresponding to a plurality of unit pixels may be arranged on the sensor unit 220. The plurality of chip pads 230 may be arranged in the first surface 212 of the chip body 210. The plurality of chip pads 230 may be electrically connected to the plurality of unit pixels of the sensor unit 220.

In some embodiments, the upper surface of the package base substrate 100 and the first surface 212 of the chip body 210 may be located at a substantially same vertical level, i.e., a first vertical level LV1. For example, the plurality of microlenses 240 may have a shape protruding upwards from the first vertical level LV1.

A dam structure 250 may be arranged on an outer region of the image sensor chip 200. For example, the dam structure 250 may be arranged between the sensor unit 220 and the plurality of chip pads 230. The dam structure 250 may have a rectangular ring shape continuously extending along an edge of the sensor unit 220, planarly between the sensor unit 220 and the plurality of chip pads 230.

The filter glass 400a may be arranged above the image sensor chip 200. The filter glass 400a may be arranged on the dam structure 250 formed on the first surface 212 of the chip body 210. The image sensor chip 200, the dam structure 250, and the filter glass 400a may define an inner space SP.

A horizontal width of the filter glass 400a may be greater than a horizontal width of the cavity 110R. The cavity 110R may completely overlap the filter glass 400a in a vertical direction. The dam structure 250 may be spaced apart from the sensor unit 220 in a horizontal direction.

The filter glass 400a may include a transparent substrate 410, a light shielding film 420 arranged on an upper surface of the transparent substrate 410, and a plurality of redistribution patterns 430a arranged on a lower surface of the transparent substrate 410. The light shielding film 420 may cover a portion of the upper surface of the transparent substrate 410. The light shielding film 420 may have an opening 420O to cover an edge portion of the upper surface of the transparent substrate 410 and not to cover a central portion of the upper surface of the transparent substrate 410. The light shielding film 420 may not overlap the sensor unit 220 in the vertical direction. The light shielding film 420 may overlap the plurality of redistribution patterns 430a, the plurality of upper surface connection pads 120UP, and the plurality of chip pads 230 in the vertical direction. In some embodiments, the light shielding film 420 may overlap the dam structure 250 in the vertical direction.

The plurality of redistribution patterns 430a may each include an inner pad 432, an outer pad 436a, and a connection line 434 connecting the inner pad 432 to the outer pad 436a. The inner pad 432, the connection line 434, and the outer pad 436a included in each of the plurality of redistribution patterns 430a may form an integral body. The plurality of redistribution patterns 430a may each have an extension length LL of about 200 μm to about 500 μm from the inner pad 432 to the outer pad 436a, and may be arranged with a pitch LP of about 70 μm to about 150 μm. The plurality of redistribution patterns 430a may each have a thickness of, for example, about 10 m to about 25 μm. The connection line 434 may have a line width LW of about 30 μm to about 70 μm. A horizontal width and a horizontal area of the outer pad 436a may be greater than a horizontal width and a horizontal area of the inner pad 432.

The package base substrate 100 and the image sensor chip 200 may be electrically connected to each other via a plurality of connection terminals 300a and the plurality of redistribution patterns 430a. The plurality of connection terminals 300a may be, for example, solder balls or bumps. The plurality of connection terminals 300a may include a plurality of inner connection terminals 310 and a plurality of outer connection terminals 320a. The inner pad 432 may have at least a portion overlapping the chip pad 230 corresponding thereto in the vertical direction, and the outer pad 436a may have at least a portion overlapping the upper surface connection pad 120UP corresponding thereto in the vertical direction. The inner connection terminal 310 may be between the inner pad 432 and the chip pad 230 corresponding to each other, and the outer connection terminal 320a may be between the outer pad 436a and the upper surface connection pad 120UP corresponding to each other.

The inner connection terminal 310 may have a first horizontal width W1 and a first vertical height H1, and the outer connection terminal 320a may have a second horizontal width W2a and a second vertical height H2. In some embodiments, the first vertical height H1 and the second vertical height H2 may be substantially the same. For example, the first vertical height H1 and the second vertical height H2 may each be about 20 μm to about 80 μm. In some embodiments, the second horizontal width W2a may be greater than the first horizontal width W1. For example, the first horizontal width W1 may be about 20 μm to about 80 μm, and the second horizontal width W2a may be about 30 μm to about 100 μm.

An encapsulant 350 may be between the package base substrate 100 and the filter glass 400a. The encapsulant 350 may fill the outside of the dam structure 250, between the package base substrate 100 and the filter glass 400a in the horizontal direction. The encapsulant 350 may not be formed in the inner space SP inside the dam structure 250. The encapsulant 350 may fill a remaining portion of the cavity 110R that is not filled by the image sensor chip 200, i.e., a space between the image sensor chip 200 and the inner side of the cavity 110R, and may surround the plurality of inner connection terminals 310 and the plurality of outer connection terminals 320a.

The plurality of chip pads 230 of the image sensor chip 200 may be electrically connected to the plurality of upper surface connection pads 120UP of the package base substrate 100 via the plurality of inner connection terminals 310, the plurality of redistribution patterns 430a including the inner pads 432, the connection lines 434, and the outer pads 436a, respectively, and the plurality of outer connection terminals 320a.

A plurality of external connection terminals 150 may be respectively attached to a plurality of lower surface connection pads 120BP of the package base substrate 100.

In the image sensor package 2 according to the one or more embodiments, the image sensor chip 200 may be arranged within the cavity 110R of the package base substrate 100, and thus, the thickness of the image sensor package 2 may be made least, thereby reducing a form factor. Also, the image sensor chip 200 and the package base substrate 100 may be electrically connected to each other via the plurality of redistribution patterns 430a formed on the lower surface of the filter glass 400a and the plurality of connection terminals 300a. Therefore, the electrical connection between the image sensor chip 200 and the package base substrate 100 may be simplified, and accordingly, a manufacturing cost may be reduced.

Figure 3:
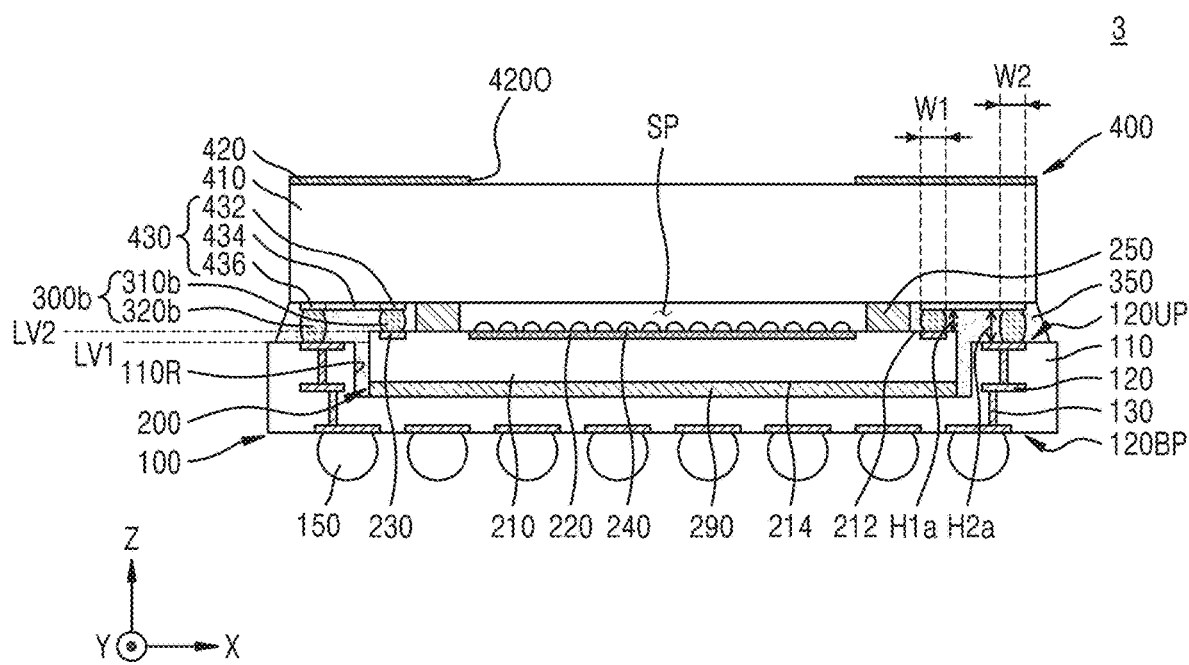
FIG. 3 is a cross-sectional view of an image sensor package according to one or more embodiments.

FIG. 3 is a cross-sectional view of an image sensor package according to one or more embodiments. The same reference numerals in FIG. 3 as those in FIGS. 1A through 2B denote the same or similar elements, and thus, a repeated description thereof may be omitted herein.

Referring to FIG. 3, an image sensor package 3 may include a package base substrate 100, an image sensor chip 200, and a filter glass 400.

The package base substrate 100 may include a base layer 110, a plurality of conductive patterns 120, and a plurality of conductive vias 130. From among the plurality of conductive patterns 120, the conductive patterns 120 arranged on an upper surface of the base layer 110 and exposed on an upper surface of the package base substrate 100 may be referred to as upper surface connection pads 120UP, and the conductive patterns 120 arranged on a lower surface of the base layer 110 and exposed on a lower surface of the package base substrate 100 may be referred to as lower surface connection pads 120BP.

The package base substrate 100 may have a cavity 110R in which the image sensor chip 200 may be accommodated. The base layer 110 may be exposed on a bottom surface and an inner side of the cavity 110R. The cavity 110R may be planarly arranged near the center of the package base substrate 100 to be spaced apart from outer sides of the package base substrate 100. The bottom surface of the cavity 110R may be located at a higher vertical level than the lower surface of the package base substrate 100.

The image sensor chip 200 may be arranged within the cavity 110R of the package base substrate 100. A horizontal cross-sectional area of the cavity 110R may be greater than a horizontal cross-sectional area of the image sensor chip 200. The image sensor chip 200 may be arranged within the cavity 110R of the package base substrate 100 such that a portion thereof is spaced apart from the inner side of the cavity 110R.

The image sensor chip 200 may include a chip body 210, a sensor unit 220, and a plurality of chip pads 230. The chip body 210 may have a first surface 212 and a second surface 214 facing each other. The image sensor chip 200 may be attached onto the bottom surface of the cavity 110R of the package base substrate 100 via a chip adhesive member 290 attached to the second surface 214 of the chip body 210.

The sensor unit 220 may be located in the first surface 212 of the chip body 210. The sensor unit 220 may be planarly arranged at a central portion of the image sensor chip 200. A plurality of microlenses 240 corresponding to a plurality of unit pixels may be arranged on the sensor unit 220. The plurality of chip pads 230 may be arranged in the first surface 212 of the chip body 210. The plurality of chip pads 230 may be electrically connected to the plurality of unit pixels of the sensor unit 220.

In some embodiments, the upper surface of the package base substrate 100 may be located at a first vertical level LV1, and the first surface 212 of the chip body 210 may be located at a second vertical level LV2 that is higher than the first vertical level LV1. An upper surface of each of the plurality of chip pads 230 may be located at a higher vertical level than the plurality of upper surface connection pads 120UP. For example, a portion of an upper portion of the chip body 210 of the image sensor chip 200 may have a shape protruding upwards from the first vertical level LV1 at which the upper surface of the package base substrate 100 is located, and the plurality of microlenses 240 may have a shape protruding upwards from the second vertical level LV2.

A dam structure 250 may be arranged on an outer region of the image sensor chip 200. For example, the dam structure 250 may be arranged between the sensor unit 220 and the plurality of chip pads 230. The dam structure 250 may have a rectangular ring shape continuously extending along an edge of the sensor unit 220, planarly between the sensor unit 220 and the plurality of chip pads 230.

The filter glass 400 may be arranged above the image sensor chip 200. The filter glass 400 may be arranged on the dam structure 250 formed on the first surface 212 of the chip body 210. The image sensor chip 200, the dam structure 250, and the filter glass 400 may define an inner space SP.

A horizontal width of the filter glass 400 may be greater than a horizontal width of the cavity 110R. The cavity 110R may completely overlap the filter glass 400 in a vertical direction. The dam structure 250 may be spaced apart from the sensor unit 220 in a horizontal direction.

The filter glass 400 may include a transparent substrate 410, a light shielding film 420 arranged on an upper surface of the transparent substrate 410, and a plurality of redistribution patterns 430 arranged on a lower surface of the transparent substrate 410. The light shielding film 420 may cover a portion of the upper surface of the transparent substrate 410. The light shielding film 420 may have an opening 4200 to cover an edge portion of the upper surface of the transparent substrate 410 and not to cover a central portion of the upper surface of the transparent substrate 410. The light shielding film 420 may not overlap the sensor unit 220 in the vertical direction. The light shielding film 420 may overlap the plurality of redistribution patterns 430, the plurality of upper surface connection pads 120UP, and the plurality of chip pads 230 in the vertical direction. In some embodiments, the light shielding film 420 may overlap the dam structure 250 in the vertical direction.

The plurality of redistribution patterns 430 may each include an inner pad 432, an outer pad 436, and a connection line 434 connecting the inner pad 432 to the outer pad 436. The package base substrate 100 and the image sensor chip 200 may be electrically connected to each other via a plurality of connection terminals 300b and the plurality of redistribution patterns 430. The plurality of connection terminals 300b may be, for example, solder balls or bumps. The plurality of connection terminals 300b may include a plurality of inner connection terminals 310b and a plurality of outer connection terminals 320b. The inner pad 432 may have at least a portion overlapping the chip pad 230 corresponding thereto in the vertical direction, and the outer pad 436 may have at least a portion overlapping the upper surface connection pad 120UP corresponding thereto in the vertical direction. The inner connection terminal 310b may be between the inner pad 432 and the chip pad 230 corresponding to each other, and the outer connection terminal 320b may be between the outer pad 436 and the upper surface connection pad 120UP corresponding to each other.

The inner connection terminal 310b may have a first horizontal width W1 and a first vertical height H1a, and the outer connection terminal 320b may have a second horizontal width W2 and a second vertical height H2a. In some embodiments, the first horizontal width W1 and the second horizontal width W2 may be substantially the same. For example, the first horizontal width W1 and the second horizontal width W2 may each be about 20 μm to about 80 m. In some embodiments, the second vertical height H2a may be greater than the first vertical height H1a. For example, the first vertical height H1a may be about 15 μm to about 75 μm, and the second vertical height H2a may be about 30 μm to about 100 μm.

An encapsulant 350 may be between the package base substrate 100 and the filter glass 400. The encapsulant 350 may fill the outside of the dam structure 250, between the package base substrate 100 and the filter glass 400 in the horizontal direction. The encapsulant 350 may not be formed in the inner space SP inside the dam structure 250. The encapsulant 350 may fill a remaining portion of the cavity 110R that is not filled by the image sensor chip 200, i.e., a space between the image sensor chip 200 and the inner side of the cavity 110R, and may surround the plurality of inner connection terminals 310b and the plurality of outer connection terminals 320b.

The plurality of chip pads 230 of the image sensor chip 200 may be electrically connected to the plurality of upper surface connection pads 120UP of the package base substrate 100a via the plurality of inner connection terminals 310b, the plurality of redistribution patterns 430 including the inner pads 432, the connection lines 434, and the outer pads 436, respectively, and the plurality of outer connection terminals 320b.

A plurality of external connection terminals 150 may be attached to the plurality of lower surface connection pads 120BP of the package base substrate 100.

Figure 4:
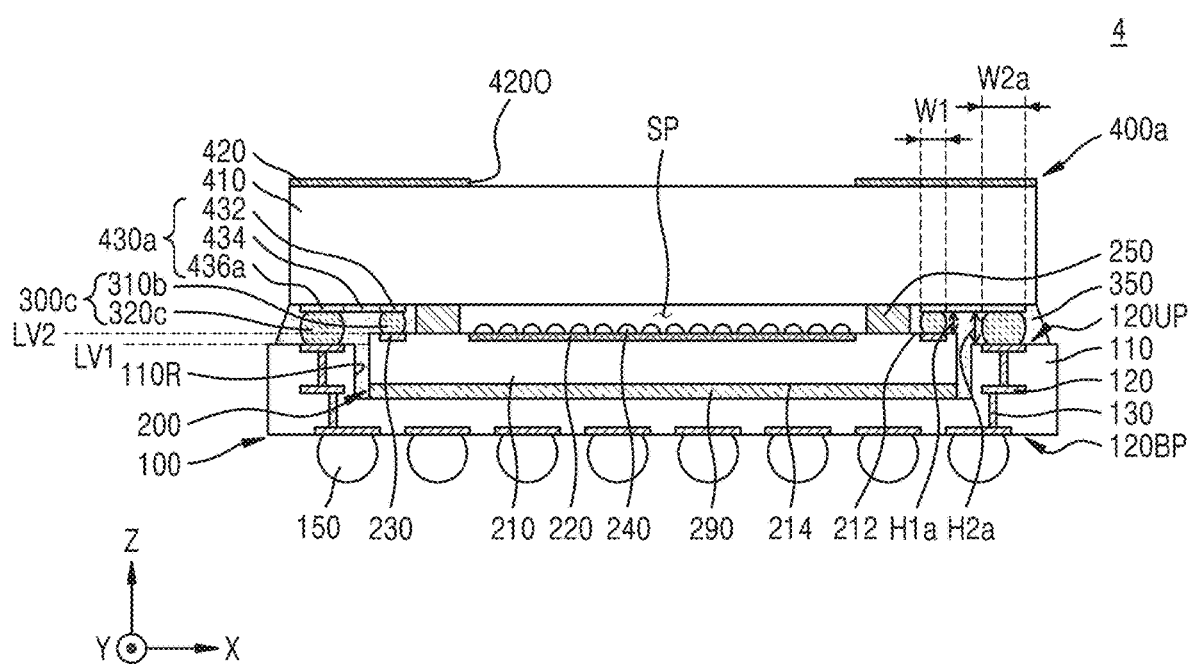
FIG. 4 is a cross-sectional view of an image sensor package according to one or more embodiments.

FIG. 4 is a cross-sectional view of an image sensor package according to one or more embodiments. The same reference numerals in FIG. 4 as those in FIGS. 1A through 3 denote the same or similar elements, and thus, a repeated description thereof may be omitted herein.

Referring to FIG. 4, an image sensor package 4 may include a package base substrate 100, an image sensor chip 200, and a filter glass 400a.

The package base substrate 100 may include a base layer 110, a plurality of conductive patterns 120, and a plurality of conductive vias 130. From among the plurality of conductive patterns 120, the conductive patterns 120 arranged on an upper surface of the base layer 110 and exposed on an upper surface of the package base substrate 100 may be referred to as upper surface connection pads 120UP, and the conductive patterns 120 arranged on a lower surface of the base layer 110 and exposed on a lower surface of the package base substrate 100 may be referred to as lower surface connection pads 120BP.

The package base substrate 100 may have a cavity 110R in which the image sensor chip 200 may be accommodated. The base layer 110 may be exposed on a bottom surface and an inner side of the cavity 110R. The cavity 110R may be planarly arranged near the center of the package base substrate 100 to be spaced apart from outer sides of the package base substrate 100. The bottom surface of the cavity 110R may be located at a higher vertical level than the lower surface of the package base substrate 100.

The image sensor chip 200 may be arranged within the cavity 110R of the package base substrate 100. A horizontal cross-sectional area of the cavity 110R may be greater than a horizontal cross-sectional area of the image sensor chip 200. The image sensor chip 200 may be arranged within the cavity 110R to be spaced apart from the inner side of the cavity 110R of the package base substrate 100.

The image sensor chip 200 may include a chip body 210, a sensor unit 220, and a plurality of chip pads 230. The chip body 210 may have a first surface 212 and a second surface 214 facing each other. The image sensor chip 200 may be attached onto the bottom surface of the cavity 110R of the package base substrate 100 via a chip adhesive member 290 attached to the second surface 214 of the chip body 210.

The sensor unit 220 may be located in the first surface 212 of the chip body 210. The sensor unit 220 may be planarly arranged at a central portion of the image sensor chip 200. A plurality of microlenses 240 corresponding to a plurality of unit pixels may be arranged on the sensor unit 220. The plurality of chip pads 230 may be arranged in the first surface 212 of the chip body 210. The plurality of chip pads 230 may be electrically connected to the plurality of unit pixels of the sensor unit 220.

In some embodiments, the upper surface of the package base substrate 100 and the first surface 212 of the chip body 210 may be located at a substantially same vertical level, i.e., a first vertical level LV1. For example, the plurality of microlenses 240 may have a shape protruding upwards from the first vertical level LV1.

A dam structure 250 may be arranged on an outer region of the image sensor chip 200. For example, the dam structure 250 may be arranged between the sensor unit 220 and the plurality of chip pads 230. The dam structure 250 may have a rectangular ring shape continuously extending along an edge of the sensor unit 220, planarly between the sensor unit 220 and the plurality of chip pads 230.

The filter glass 400a may be arranged above the image sensor chip 200. The filter glass 400a may be arranged on the dam structure 250 formed on the first surface 212 of the chip body 210. The image sensor chip 200, the dam structure 250, and the filter glass 400a may define an inner space SP.

A horizontal width of the filter glass 400a may be greater than a horizontal width of the cavity 110R. The cavity 110R may completely overlap the filter glass 400a in a vertical direction. The dam structure 250 may be spaced apart from the sensor unit 220 in a horizontal direction.

The filter glass 400a may include a transparent substrate 410, a light shielding film 420 arranged on an upper surface of the transparent substrate 410, and a plurality of redistribution patterns 430a arranged on a lower surface of the transparent substrate 410. The light shielding film 420 may cover a portion of the upper surface of the transparent substrate 410. The light shielding film 420 may have an opening 420O to cover an edge portion of the upper surface of the transparent substrate 410 and not to cover a central portion of the upper surface of the transparent substrate 410. The light shielding film 420 may not overlap the sensor unit 220 in the vertical direction. The light shielding film 420 may overlap the plurality of redistribution patterns 430a, the plurality of upper surface connection pads 120UP, and the plurality of chip pads 230 in the vertical direction. In some embodiments, the light shielding film 420 may overlap the dam structure 250 in the vertical direction.

The plurality of redistribution patterns 430a may each include an inner pad 432, an outer pad 436a, and a connection line 434 connecting the inner pad 432 to the outer pad 436a. The inner pad 432, the connection line 434, and the outer pad 436a included in each of the plurality of redistribution patterns 430a may form an integral body. The plurality of redistribution patterns 430a may each have an extension length LL of about 200 μm to about 500 μm from the inner pad 432 to the outer pad 436a, and may be arranged with a pitch LP of about 70 μm to about 150 μm. The plurality of redistribution patterns 430a may each have a thickness of, for example, about 10 m to about 25 μm. The connection line 434 may have a line width LW of about 30 μm to about 70 μm. A horizontal width and a horizontal area of the outer pad 436a may be greater than a horizontal width and a horizontal area of the inner pad 432.

The package base substrate 100 and the image sensor chip 200 may be electrically connected to each other via a plurality of connection terminals 300c and the plurality of redistribution patterns 430a. The plurality of connection terminals 300c may be, for example, solder balls or bumps. The plurality of connection terminals 300c may include a plurality of inner connection terminals 310b and a plurality of outer connection terminals 320c. The inner pad 432 may have at least a portion overlapping the chip pad 230 corresponding thereto in the vertical direction, and the outer pad 436a may have at least a portion overlapping the upper surface connection pad 120UP corresponding thereto in the vertical direction. The inner connection terminal 310b may be between the inner pad 432 and the chip pad 230 corresponding to each other, and the outer connection terminal 320c may be between the outer pad 436a and the upper surface connection pad 120UP corresponding to each other.

The inner connection terminal 310b may have a first horizontal width W1 and a first vertical height H1a, and the outer connection terminal 320c may have a second horizontal width W2a and a second vertical height H2a. In some embodiments, the second horizontal width W2a may be greater than the first horizontal width W1. For example, the first horizontal width W1 may be about 20 μm to about 80 μm, and the second horizontal width W2a may be about 30 m to about 100 μm. In some embodiments, the second vertical height H2a may be greater than the first vertical height H1a. For example, the first vertical height H1a may be about 15 μm to about 75 μm, and the second vertical height H2a may be about 30 μm to about 100 am.

An encapsulant 350 may be between the package base substrate 100 and the filter glass 400a. The encapsulant 350 may fill the outside of the dam structure 250, between the package base substrate 100 and the filter glass 400a in the horizontal direction. The encapsulant 350 may not be formed in the inner space SP inside the dam structure 250. The encapsulant 350 may fill a remaining portion of the cavity 110R that is not filled by the image sensor chip 200, i.e., a space between the image sensor chip 200 and an inner side of the cavity 110R, and may surround the plurality of inner connection terminals 310b and the plurality of outer connection terminals 320c.

The plurality of chip pads 230 of the image sensor chip 200 may be electrically connected to the plurality of upper surface connection pads 120UP of the package base substrate 100 via the plurality of inner connection terminals 310b, the plurality of redistribution patterns 430a including the inner pads 432, the connection lines 434, and the outer pads 436a, respectively, and the plurality of outer connection terminals 320c.

A plurality of external connection terminals 150 may be attached to the plurality of lower surface connection pads 120BP of the package base substrate 100.

FIGS. 5A through 5D are cross-sectional views illustrating a method of manufacturing an image sensor package, according to one or more embodiments. In detail, FIGS. 5A through 5D are cross-sectional views illustrating a method of manufacturing the image sensor package 1 shown in FIGS. 1A through 1C. The same reference numerals in FIGS. 5A through 5D as those in FIGS. 1A through 1C denote the same or similar elements, and thus, a repeated description thereof may be omitted herein.

Figure 5A:
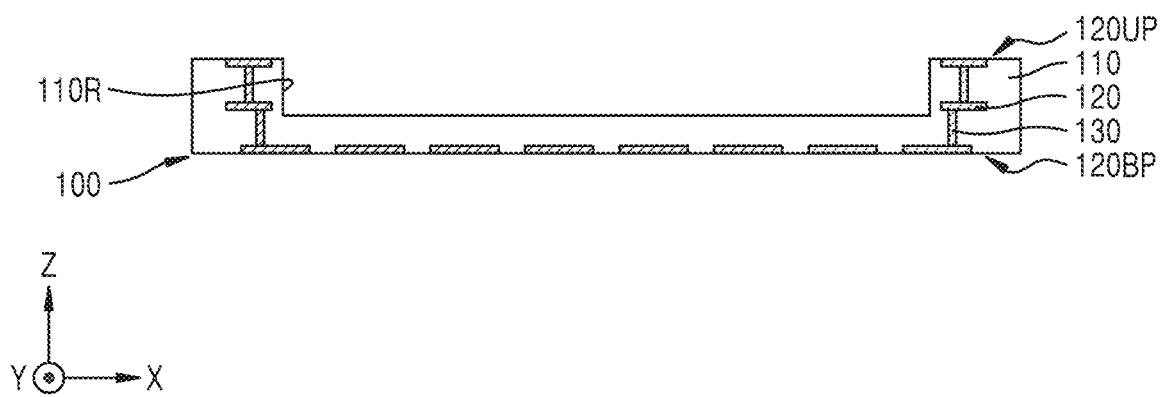
FIGS. 5A through 5D are cross-sectional views illustrating a method of manufacturing an image sensor package, according to one or more embodiments.

Referring to FIG. 5A, a package base substrate 100 having a cavity 110R is provided. The package base substrate 100 may be, for example, a printed circuit board. In some embodiments, the package base substrate 100 may be a multilayer printed circuit board. The package base substrate 100 may include a base layer 110, a plurality of conductive patterns 120, and a plurality of conductive vias 130.

The base layer 110 may be exposed on a bottom surface and an inner side of the cavity 110R. The cavity 110R may be planarly arranged near the center of the package base substrate 100 to be spaced apart from outer sides of the package base substrate 100. For example, the cavity 110R may be formed by planarly removing a central portion of an upper portion of the base layer 110. The bottom surface of the cavity 110R may be located at a higher vertical level than a lower surface of the package base substrate 100.

The plurality of conductive patterns 120 may be arranged on an upper surface and a lower surface of the base layer 110, or may be arranged on the upper surface and the lower surface of the base layer 110 and inside the base layer 110, and extend in a horizontal direction. From among the plurality of conductive patterns 120, the conductive patterns 120 arranged on the upper surface of the base layer 110 and exposed on an upper surface of the package base substrate 100 may be referred to as upper surface connection pads 120UP, and the conductive patterns 120 arranged on the lower surface of the base layer 110 and exposed on the lower surface of the package base substrate 100 may be referred to as lower surface connection pads 120BP. The plurality of conductive vias 130 may pass through a portion of the base layer 110 and extend in a vertical direction to electrically connect the conductive patterns 120 located at different vertical levels.

Figure 5B:
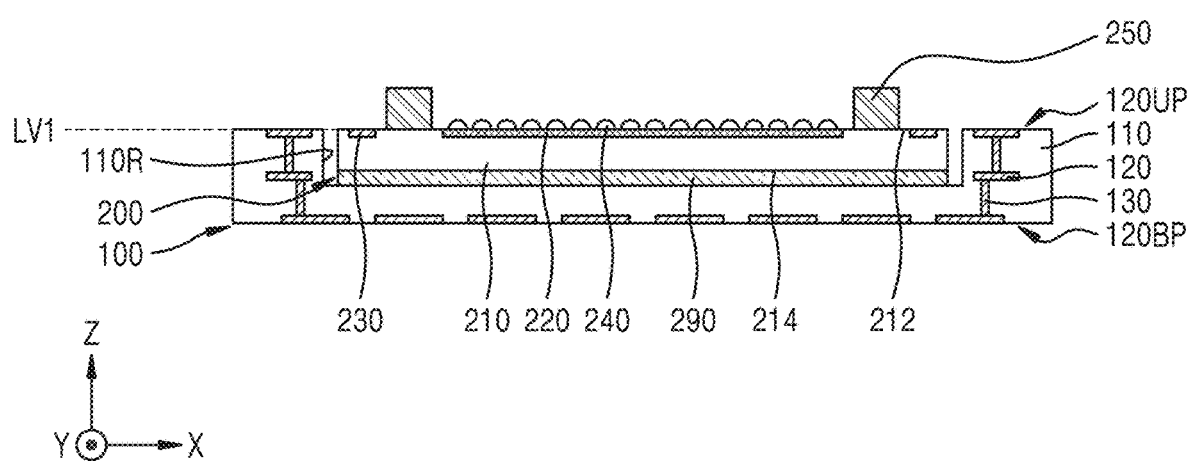

Referring to FIG. 5B, an image sensor chip 200 may be arranged within the cavity 110R of the package base substrate 100. The image sensor chip 200 may include a chip body 210, a sensor unit 220, and a plurality of chip pads 230. The chip body 210 may have a first surface 212 and a second surface 214 facing each other. The image sensor chip 200 may be attached onto the bottom surface of the cavity 110R of the package base substrate 100 via a chip adhesive member 290 attached to the second surface 214 of the chip body 210.

A horizontal cross-sectional area of the cavity 110R may be greater than a horizontal cross-sectional area of the image sensor chip 200. The image sensor chip 200 may be arranged within the cavity 110R to be spaced apart from the inner side of the cavity 110R of the package base substrate 100. A depth of the cavity 110R may be substantially similar to or slightly greater than a thickness of the image sensor chip 200.

In some embodiments, the image sensor chip 200 may be arranged within the cavity 110R of the package base substrate 100, such that the upper surface of the package base substrate 100 and the first surface 212 of the chip body 210 may be located at a substantially same vertical level, i.e., a first vertical level LV1.

A dam structure 250 may be arranged on the first surface 212 of the chip body 210 not to cover the sensor unit 220 and the plurality of chip pads 230 of the image sensor chip 200. In some embodiments, the dam structure 250 may be formed on an upper surface of the image sensor chip 200 before the image sensor chip 200 is arranged within the cavity 110R of the package base substrate 100.

Figure 5C:
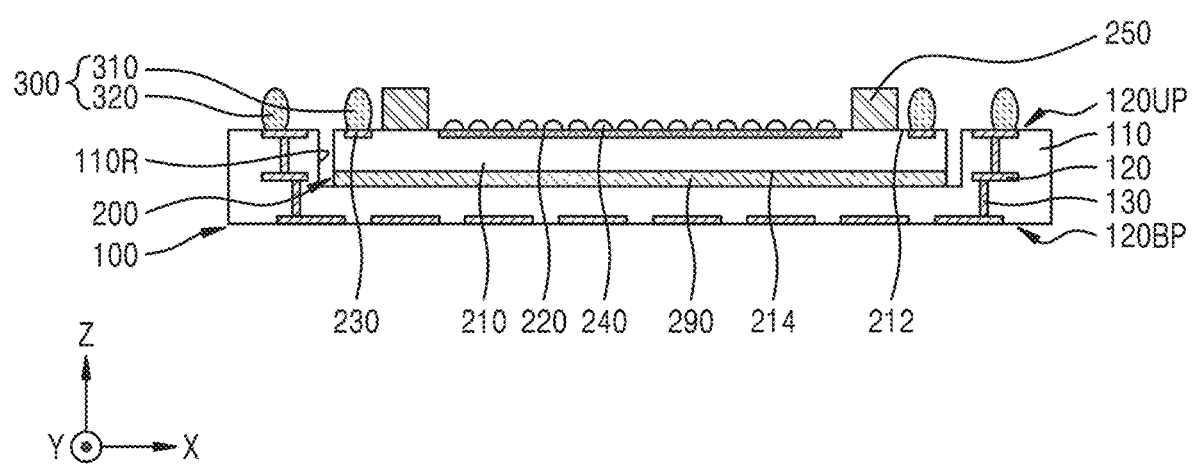

Referring to FIG. 5C, a plurality of inner connection terminals 310 may be attached onto the plurality of chip pads 230, and a plurality of outer connection terminals 320 may be attached onto a plurality of upper surface connection pads 120UP.

Figure 5D:
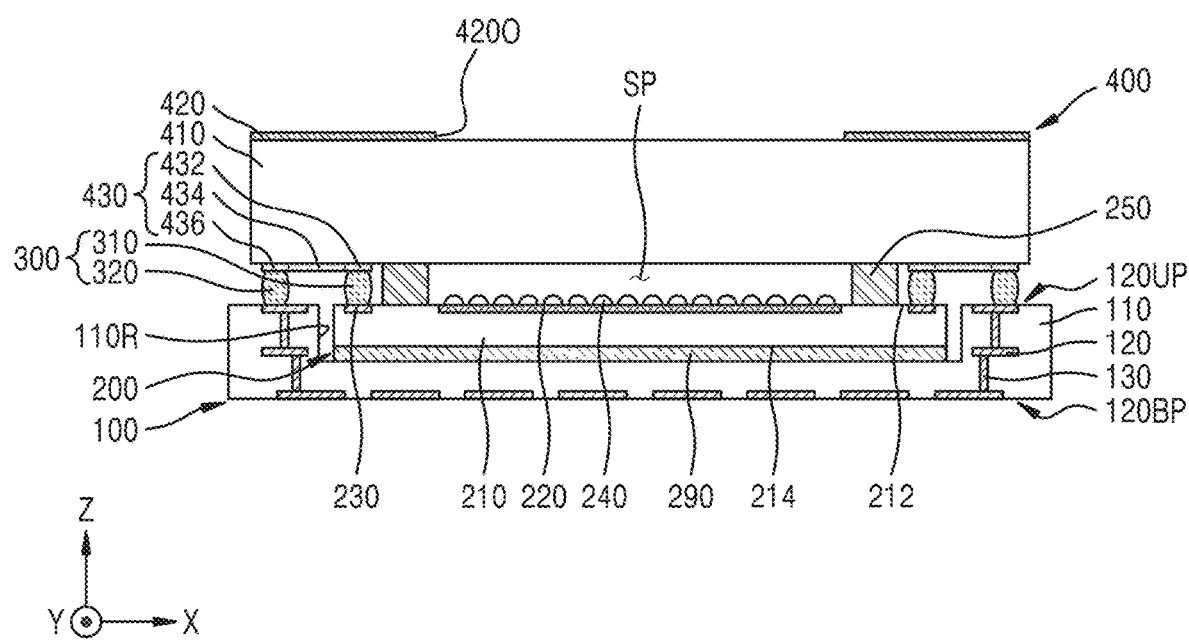

Referring to FIG. 5D, a filter glass 400 may be attached above the image sensor chip 200, such that a lower surface thereof is in contact with an upper surface of the dam structure 250. The filter glass 400 may include a transparent substrate 410, a light shielding film 420 arranged on an upper surface of the transparent substrate 410, and a plurality of redistribution patterns 430 arranged on a lower surface of the transparent substrate 410.

The light shielding film 420 may be formed to cover a portion of the upper surface of the transparent substrate 410. The light shielding film 420 may be formed to have an opening 420O to cover an edge portion of the upper surface of the transparent substrate 410 and not to cover a central portion of the upper surface of the transparent substrate 410. The filter glass 400 may be arranged above the image sensor chip 200, such that the light shielding film 420 may not overlap the sensor unit 220 in the vertical direction. The filter glass 400 may be arranged above the image sensor chip 200, such that the light shielding film 420 may overlap the plurality of redistribution patterns 430, the plurality of upper surface connection pads 120UP, and the plurality of chip pads 230 in the vertical direction.

The plurality of redistribution patterns 430 may each include an inner pad 432, an outer pad 436, and a connection line 434 connecting the inner pad 432 to the outer pad 436.

The filter glass 400 may be spaced apart from the image sensor chip 200 by a height of the dam structure 250 in the vertical direction, and an inner space SP may be formed between the filter glass 400 and the image sensor chip 200.

Thereafter, as described above with reference to FIG. 1A, the encapsulant 350, which fills the outside of the dam structure 250, between the package base substrate 100 and the filter glass 400 and does not fill the inner space SP, may be formed between the package base substrate 100 and the filter glass 400 to surround the plurality of inner connection terminals 310 and the plurality of outer connection terminals 320, and the plurality of external connection terminals 150 may be attached to the plurality of lower surface connection pads 120BP, thereby forming the image sensor package 1.

Referring to FIGS. 1A through 1C, and FIGS. 5A through 5D together, in the method of manufacturing the image sensor package 1, according to the one or more embodiments, the image sensor chip 200 may be arranged within the cavity 110R of the package base substrate 100, and thus, the image sensor package 1 having a reduced form factor may be manufactured. Also, the plurality of redistribution patterns 430 may be formed on the lower surface of the filter glass 400, and the plurality of connection terminals 300 may be used, to electrically connect the image sensor chip 200 to the package base substrate 100, and thus, the manufacturing cost of the image sensor package 1 may be reduced.

The image sensor package 2 shown in FIGS. 2A and 2B may be formed by attaching the plurality of outer connection terminals 320a to the plurality of upper surface connection pads 120UP, instead of the plurality of outer connection terminals 320 shown in FIG. 5C, forming the plurality of redistribution patterns 430a instead of the plurality of redistribution patterns 430 shown in FIG. 5D, and arranging the plurality of outer connection terminals 320a between the outer pads 436a of the plurality of redistribution patterns 430a and the plurality of upper surface connection pads 120UP, instead of arranging the plurality of outer connection terminals 320 shown in FIG. 5D between the outer pads 436 of the plurality of redistribution patterns 430 and the plurality of upper surface connection pads 120UP.

FIGS. 6A through 6F are cross-sectional views illustrating a method of manufacturing an image sensor package, according to one or more embodiments. In detail, FIGS. 6A through 6F are cross-sectional views illustrating a method of manufacturing the image sensor package 1 shown in FIGS. 1A through 1C. The same reference numerals in FIGS. 6A through 6F as those in FIGS. 1A through 1C denote the same or similar elements, and thus, a repeated description thereof may be omitted herein.

Figure 6A:
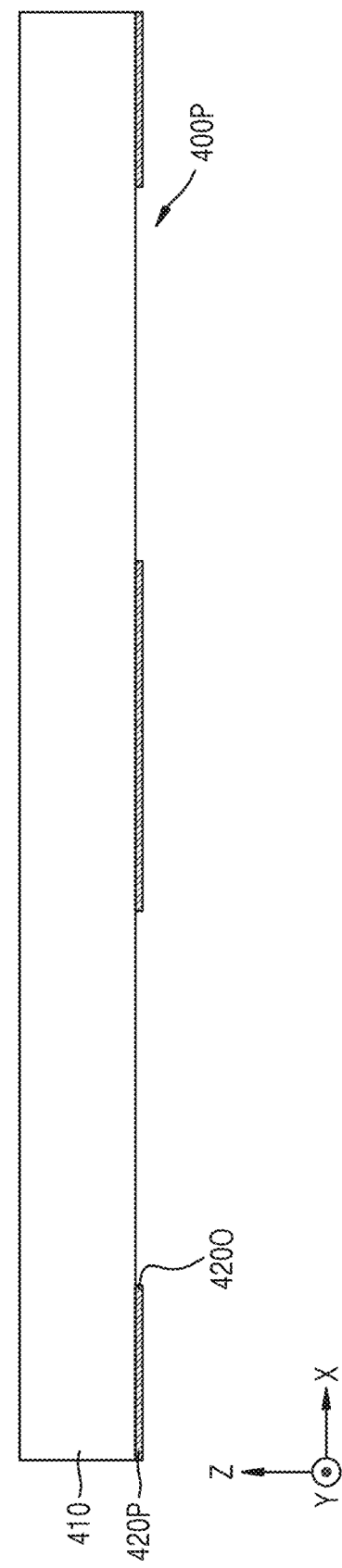
FIGS. 6A through 6F are cross-sectional views illustrating a method of manufacturing an image sensor package, according to one or more embodiments.

Referring to FIG. 6A, a light shielding film pattern 420P may be formed on a lower surface of a transparent substrate 410 to provide a filter glass substrate 400P. The light shielding film pattern 420P formed on a lower surface of the filter glass substrate 400P may planarly have a mesh shape with a plurality of openings 420O. The light shielding film pattern 420P having the mesh shape with the plurality of openings 420O may be separated into a plurality of light shielding film patterns in a subsequent process to be a light shielding film 420 having a rectangular ring shape with one opening 420O as shown in FIGS. 1A through 1C.

Figure 6B:
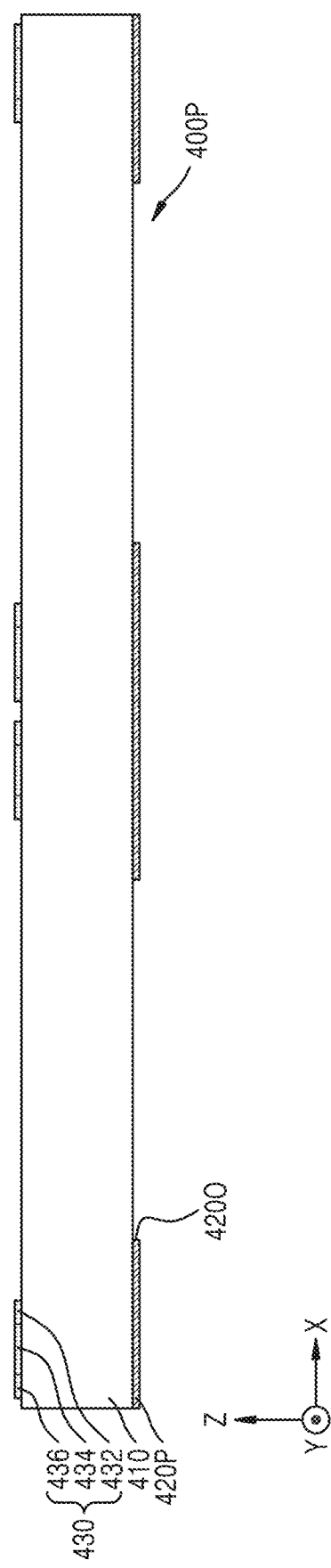

Referring to FIG. 6B, a plurality of redistribution patterns 430 may be formed on an upper surface of the transparent substrate 410. The plurality of redistribution patterns 430 may each include an inner pad 432, an outer pad 436, and a connection line 434 connecting the inner pad 432 to the outer pad 436. The inner pad 432, the connection line 434, and the outer pad 436 included in each of the plurality of redistribution patterns 430 may form an integral body. The plurality of redistribution patterns 430 and the light shielding film pattern 420P may be formed to overlap the plurality of chip pads 230 in a vertical direction.

Figure 6C:
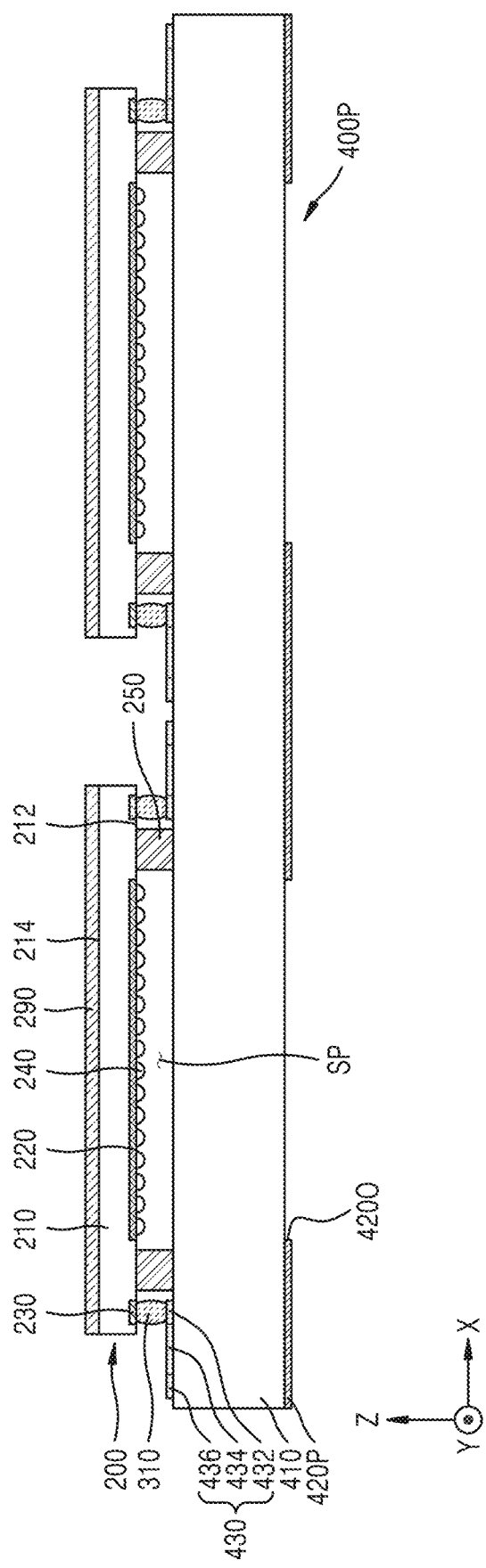

Referring to FIG. 6C, the filter glass substrate 400P, which is the result of FIG. 6B, is turned upside down such that the plurality of redistribution patterns 430 may be located upwards and the light shielding film pattern 420P may be located downwards.

Thereafter, above the filter glass substrate 400P, a dam structure 250 may be formed on a first surface 212 of a chip body 210, and a plurality of image sensor chips 200 each including a plurality of chip pads 230 having a plurality of inner connection terminals 310 attached thereto may be attached. The dam structure 250 may be attached to the upper surface of the transparent substrate 410 of the filter glass substrate 400P, and the plurality of inner connection terminals 310 may be respectively attached to the inner pads 432 of the plurality of redistribution patterns 430.

Each of the plurality of image sensor chips 200 may be attached above the filter glass substrate 400P, such that the sensor unit 220 overlaps each of the plurality of openings 420O of the light shielding film pattern 420P in the vertical direction.

An upper surface and a lower surface of the dam structure 250 may be respectively attached to the first surface 212 of the chip body 210 of the image sensor chip 200 and an upper surface of the filter glass substrate 400P to form an inner space SP defined by the image sensor chip 200, the dam structure 250, and the filter glass substrate 400P.

Figure 6D:
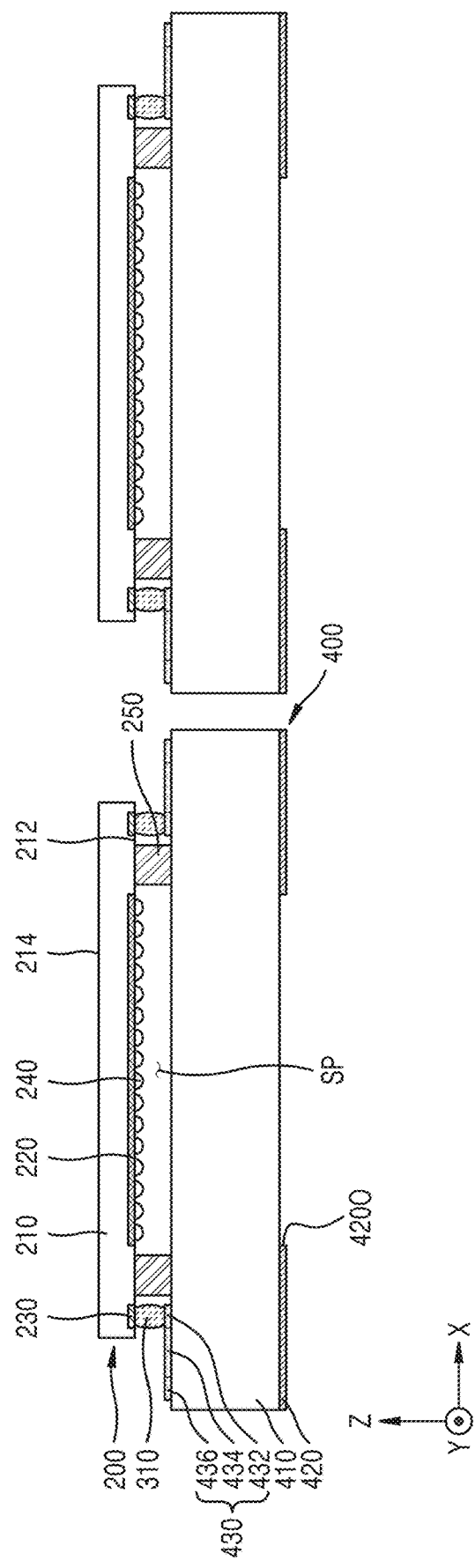

Referring to FIGS. 6C and 6D together, the filter glass substrate 400P may be separated to form a plurality of filter glasses 400 above which the plurality of image sensor chips 200 are respectively attached. The plurality of filter glasses 400 may each include a light shielding film 420 which is formed by separating the light shielding film pattern 420P and has a rectangular ring shape with one opening 420O.

Figure 6E:
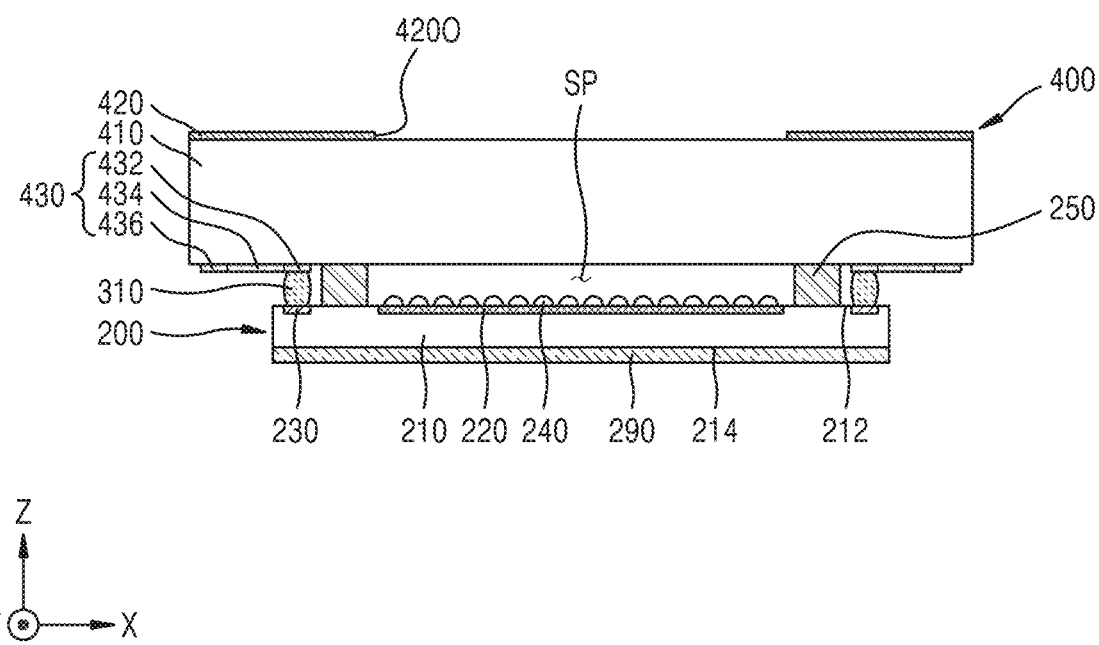

Referring to FIG. 6E, the result of FIG. 6D may be turned upside down such that the filter glass 400 may be located upwards, and the image sensor chip 200 may be located downwards.

Figure 6F:
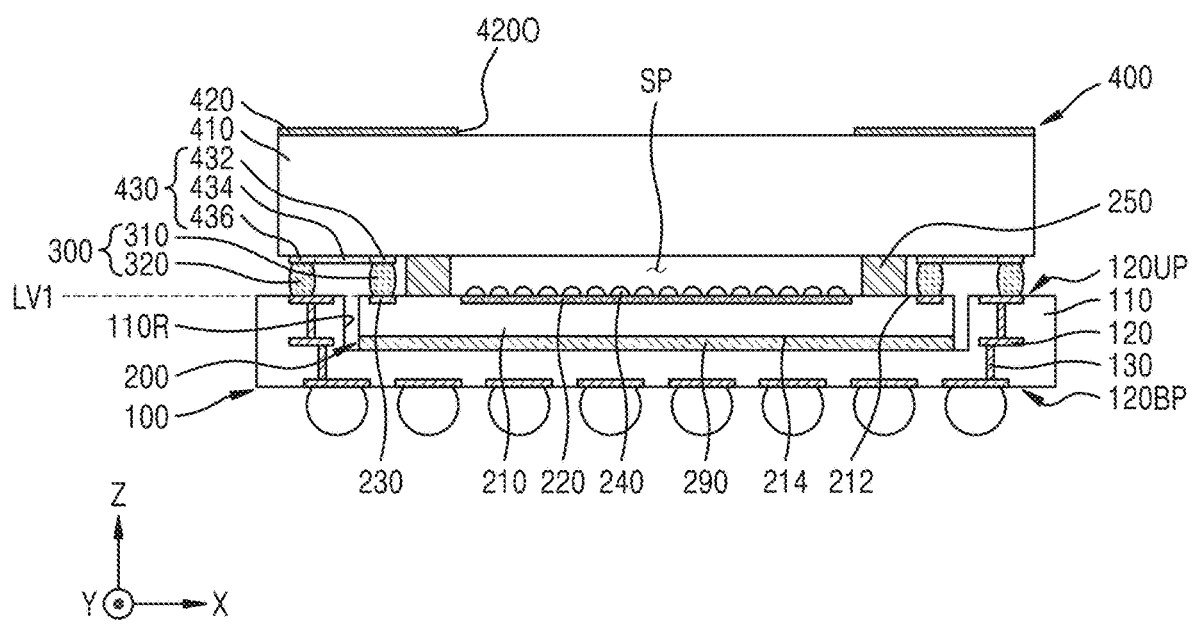

Referring to FIG. 6F, the image sensor chip 200 above which the filter glass 400 is attached may be attached into a cavity 110R of a package base substrate 100. The image sensor chip 200 may be attached onto a bottom surface of the cavity 110R of the package base substrate 100 via a chip adhesive member 290 attached to a second surface 214 of the chip body 210.

In some embodiments, before the image sensor chip 200 is attached into the cavity 110R of the package base substrate 100, a plurality of outer connection terminals 320 may be attached to a plurality of upper surface connection pads 120UP of the package base substrate 100. In some other embodiments, before the image sensor chip 200 is attached into the cavity 110R of the package base substrate 100, the plurality of outer connection terminals 320 may be attached to the outer pads 436 of the plurality of redistribution patterns 430. The image sensor chip 200 may be attached into the cavity 110R of the package base substrate 100, such that the plurality of outer connection terminals 320 may have upper surfaces attached to the outer pads 436 of the plurality of redistribution patterns 430 and lower surfaces attached to the plurality of upper surface connection pads 120UP.

In some embodiments, the image sensor chip 200 may be arranged within the cavity 110R of the package base substrate 100, such that an upper surface of the package base substrate 100 and the first surface 212 of the chip body 210 may be located at a substantially same vertical level, i.e., a first vertical level LV1.

Thereafter, as described above with reference to FIG. 1A, an encapsulant 350, which fills the outside of the dam structure 250, between the package base substrate 100 and the filter glass 400 and not cover the inner space SP, may be formed between the package base substrate 100 and the filter glass 400 to surround the plurality of inner connection terminals 310 and the plurality of outer connection terminals 320, and a plurality of external connection terminals 150 may be attached to the plurality of lower surface connection pads 120BP, thereby forming the image sensor package 1.

The image sensor package 2 shown in FIGS. 2A and 2B may be formed by forming the plurality of redistribution patterns 430*a* instead of the plurality of redistribution patterns 430 shown in FIG. 6B, and arranging the plurality of outer connection terminals 320*a* between the outer pads 436*s* of the plurality of redistribution patterns 430*a* and the plurality of upper surface connection pads 120UP, instead of arranging the plurality of outer connection terminals 320 shown in FIG. 6B between the outer pads 436 of the plurality of redistribution patterns 430 and the plurality of upper surface connection pads 120UP.

Referring to FIGS. 5A through 6F together, the image sensor package 3 shown in FIG. 3 and the image sensor package 4 shown in FIG. 4 may be formed by attaching the image sensor chip 200 into the cavity 110R of the package base substrate 100 such that the first surface 212 of the chip body 210 of the image sensor chip 200 may be located at the second vertical level LV2 that is higher than the first vertical level LV1, instead of attaching the image sensor chip 200 into the cavity 110R of the package base substrate 100 such that the upper surface of the package base substrate 100 and the first surface 212 of the chip body 210 may be located at the first vertical level LV that is a substantially same vertical level as shown in FIG. 5B or 6F.

FIGS. 7 through 10 are cross-sectional views illustrating a system including an image sensor package, according to one or more embodiments.

Figure 7:
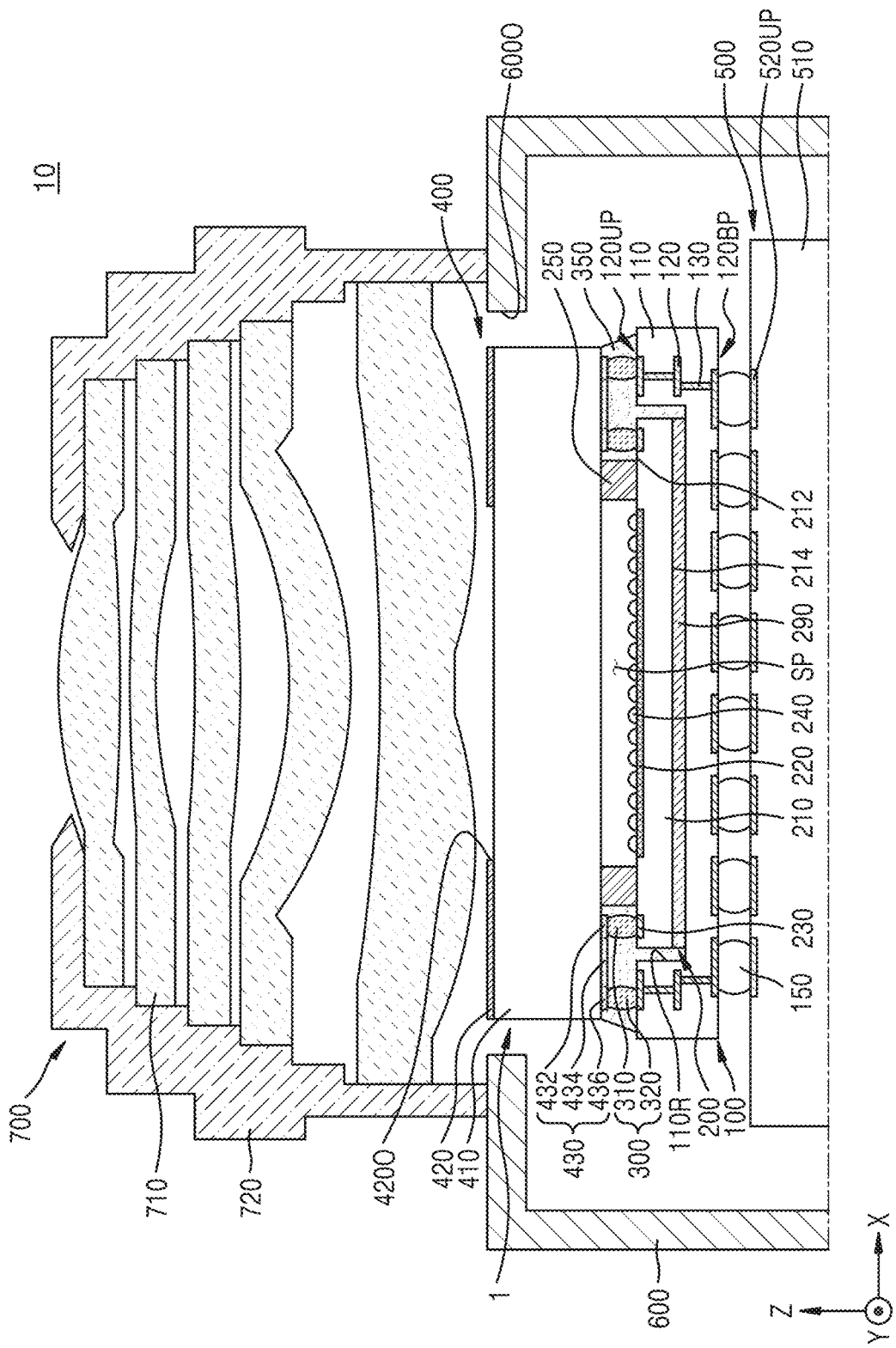
FIGS. 7 through 10 are cross-sectional views illustrating a system including an image sensor package, according to one or more embodiments.

Referring to FIG. 7, a system 10 may include a housing 600 having a light incidence opening 600O, a system board 500 mounted within the housing 600, an image sensor package 1 attached onto the system board 500 within the housing 600, and an optical unit 700 coupled to the light incidence opening 600O. In some embodiments, the system 10 may be a camera device.

The housing 600 may surround the image sensor package 1, and may protect the image sensor package 1 from a physical impact from the outside. Also, the housing 600 may shield the permeation of disturbance into the image sensor package 1 by including an electro magnetic interference (EMI) shielding material.

The system board 500 may be, for example, a printed circuit board. The system board 500 may include a board base layer 510 and a plurality of sensor connection pads 520UP arranged on an upper surface of the board base layer 510. The board base layer 510 may be formed of at least one material selected from a phenol resin, an epoxy resin, and polyimide. The board base layer 510 and the sensor connection pads 520UP are substantially similar to the base layer 110 and the upper surface connection pads 120UP described above with reference to FIGS. 1A through 1C, and thus, a detailed description thereof will be omitted herein.

The image sensor package 1 may be electrically connected to the system board 500 via a plurality of external connection terminals 150 arranged between a plurality of lower surface connection pads 120BP and the plurality of sensor connection pads 520UP.

The image sensor package 1 may be attached to the system board 500 such that a sensor unit 220 corresponds to the light incidence opening 600O of the housing 600.

The optical unit 700 may include a barrel 720 coupled to the housing 600 and at least one lens 710 supported by the barrel 720. In some embodiments, the optical unit 700 may include a plurality of lenses 710 supported by the barrel 720, and spaced apart from each other in a vertical direction. The optical unit 700 may refract light incident from the outside and allow the refracted light to be incident on the image sensor package 1. In other words, light incident on the system 10 may pass through the at least one lens 710 included in the optical unit 700, a filter glass 400, and a plurality of microlenses 240, and reach the sensor unit 220.

The system 10 according to the one or more embodiments may include the image sensor package 1 having a reduced form factor and a reduced manufacturing cost. Therefore, a form factor of the system 10 may also be reduced, and a manufacturing cost of the system 10 may also be reduced.

Figure 8:
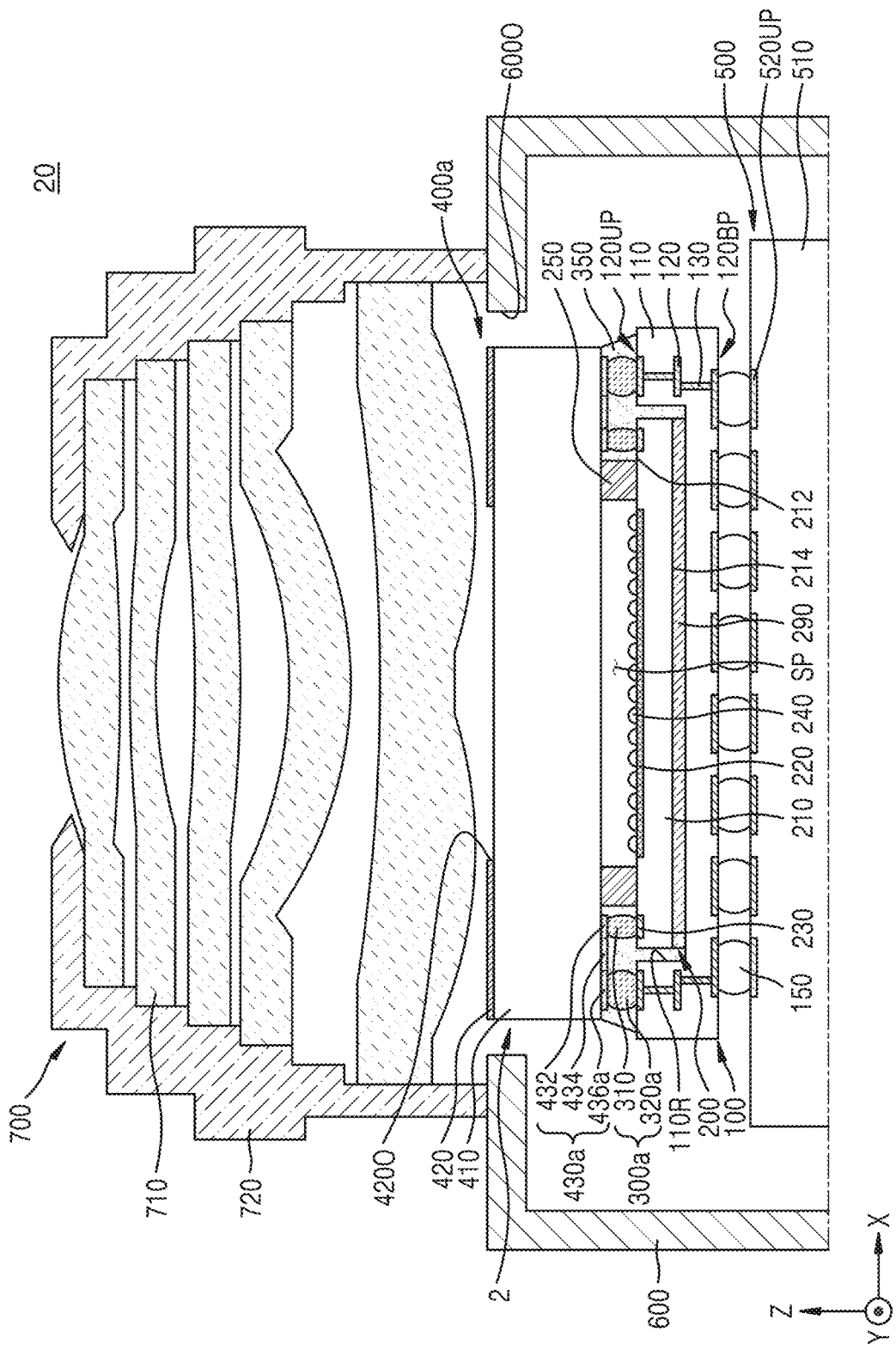

Referring to FIG. 8, a system 20 may include a housing 600 having a light incidence opening 600O, a system board 500 mounted within the housing 600, an image sensor package 2 attached onto the system board 500 within the housing 600, and an optical unit 700 coupled to the light incidence opening 600O. In some embodiments, the system 20 may be a camera device.

The system 20 shown in FIG. 8 is substantially similar to the system 10 shown in FIG. 7, except that the system 20 includes the image sensor package 2 instead of the image sensor package 1 shown in FIG. 7, and thus, a detailed description thereof will be omitted herein.

Figure 9:
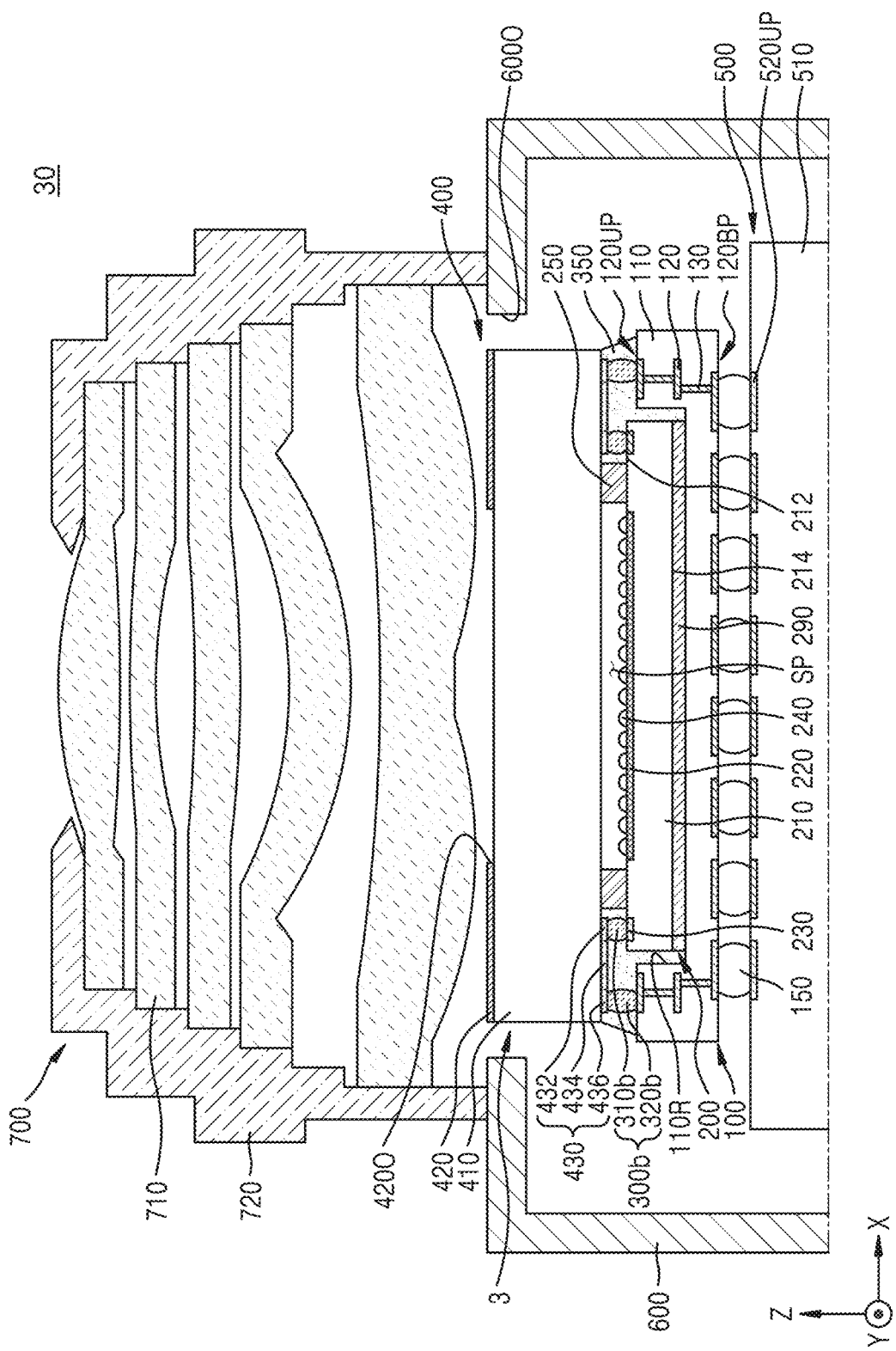

Referring to FIG. 9, a system 30 may include a housing 600 having a light incidence opening 600O, a system board 500 mounted within the housing 600, an image sensor package 3 attached onto the system board 500 within the housing 600, and an optical unit 700 coupled to the light incidence opening 600O. In some embodiments, the system 30 may be a camera device.

The system 30 shown in FIG. 9 is substantially similar to the system 10 shown in FIG. 7, except that the system 30 includes the image sensor package 3 instead of the image sensor package 1 shown in FIG. 7, and thus, a detailed description thereof will be omitted herein.

Figure 10:
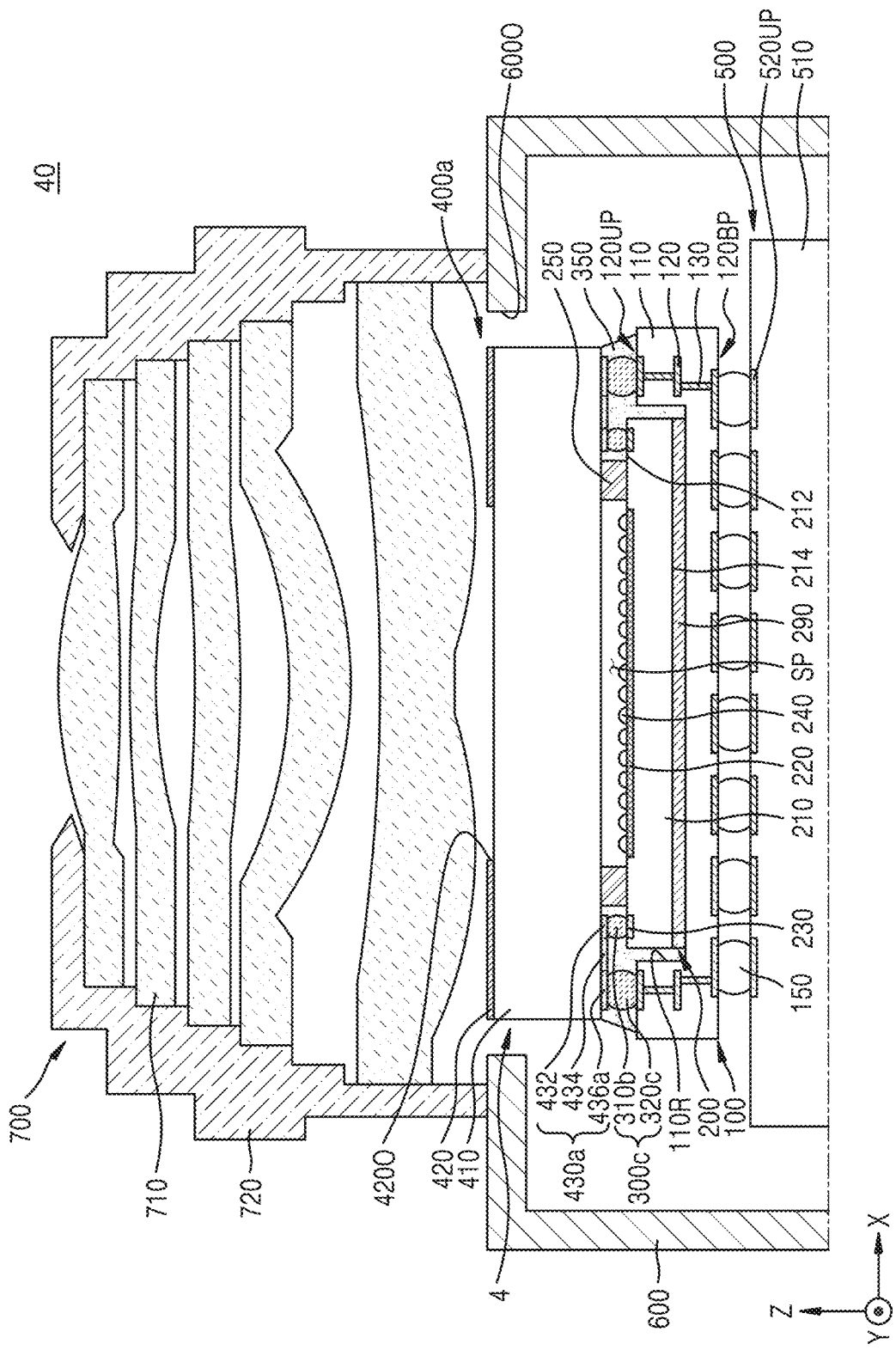

Referring to FIG. 10, a system 40 may include a housing 600 having a light incidence opening 600O, a system board 500 mounted within the housing 600, an image sensor package 4 attached onto the system board 500 within the housing 600, and an optical unit 700 coupled to the light incidence opening 600O. In some embodiments, the system 40 may be a camera device.

The system 40 shown in FIG. 10 is substantially similar to the system 10 shown in FIG. 7, except that the system 40 includes the image sensor package 4 instead of the image sensor package 1 shown in FIG. 7, and thus, a detailed description thereof will be omitted herein.

Figure 11:
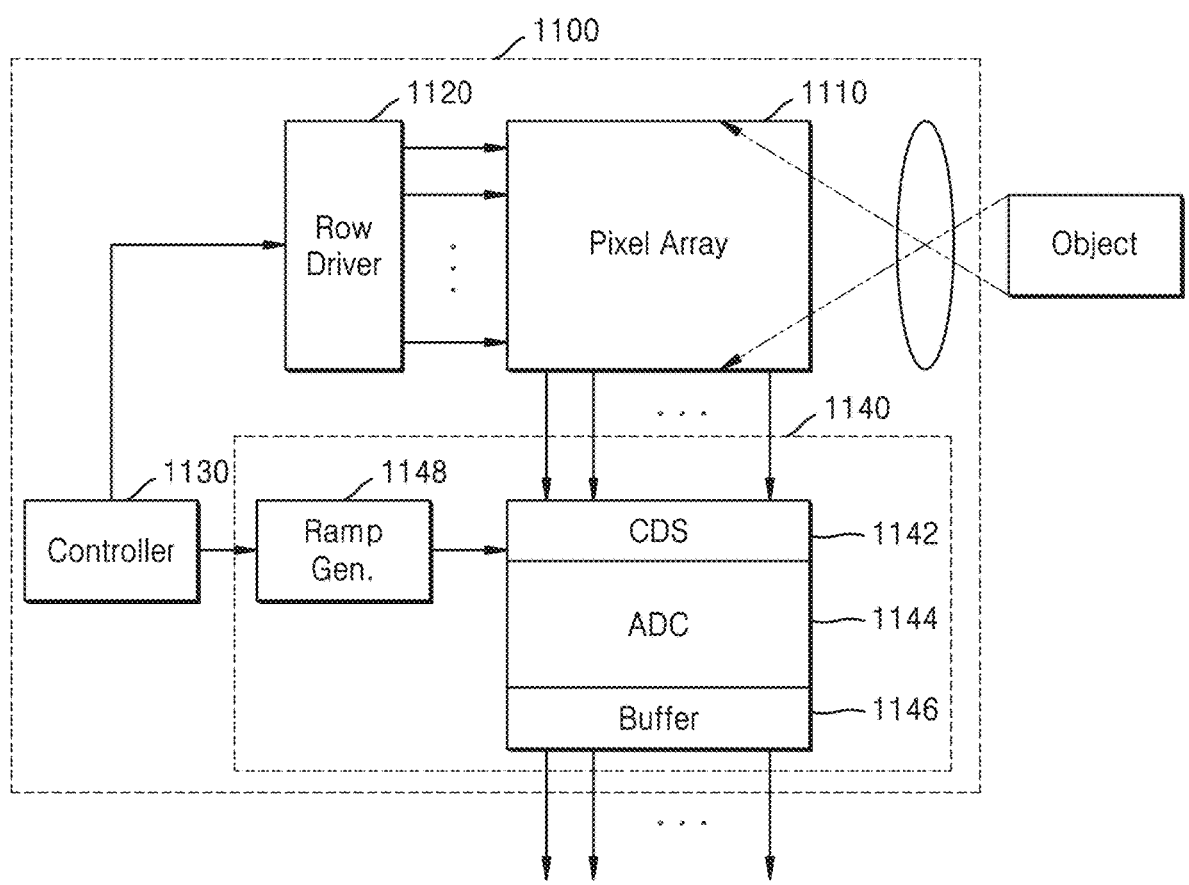
FIG. 11 is a block diagram illustrating a configuration of an image sensor chip included in an image sensor package, according to one or more embodiments.

FIG. 11 is a block diagram illustrating a configuration of an image sensor chip included in an image sensor package, according to one or more embodiments.

Referring to FIG. 11, an image sensor chip 1100 may include a pixel array 1110, a controller 1130, a row driver 1120, and a pixel signal processing unit 1140. The image sensor chip 1100 may be the image sensor chip 200 described above with reference to FIGS. 1A through 10.

The pixel array 1110 may include a plurality of unit pixels arranged two-dimensionally, and each unit pixel may include a photoelectric conversion layer. The photoelectric conversion layer may absorb light to generate a charge, and an electrical signal (an output voltage) according to the generated charge may be provided to the pixel signal processing unit 1140 via a vertical signal line. The unit pixels included in the pixel array 1110 may provide an output voltage one at a time in a row unit, and accordingly, the unit pixels belonging to one row of the pixel array 1110 may be simultaneously activated by a selection signal output from the row driver 1120. The unit pixels belonging to the selected row may provide the output voltage according to the absorbed light to an output line of a corresponding column.

The controller 1130 may control the row driver 1120 to allow the pixel array 1110 to absorb light, accumulate the charge, or temporarily store the accumulated charge, and output the electrical signal according to the stored charge to the outside of the pixel array 1110. Also, the controller 1130 may control the pixel signal processing unit 1140 to measure the output voltage provided by the pixel array 1110.

The pixel signal processing unit 1140 may include a correlated double sampler (CDS) 1142, an analog-to-digital converter (ADC) 1144, and a buffer 1146. The correlated double sampler 1142 may sample and hold the output voltage provided by the pixel array 1110. The correlated double sampler 1142 may doubly sample a particular noise level, and a level according to the generated output voltage, and may output a level corresponding to a difference therebetween. In addition, the correlated double sampler 1142 may receive ramp signals generated by a ramp signal generator 1148 and compare the ramp signals with each other to output a comparison result. The analog-to-digital converter 1144 may convert, into a digital signal, an analog signal corresponding to the level received from the correlated double sampler 1142. The buffer 1146 may latch the digital signal, and the latched signals may be sequentially output to the outside of the image sensor chip 1100 and transmitted to an image processor (not shown).

Figure 12:
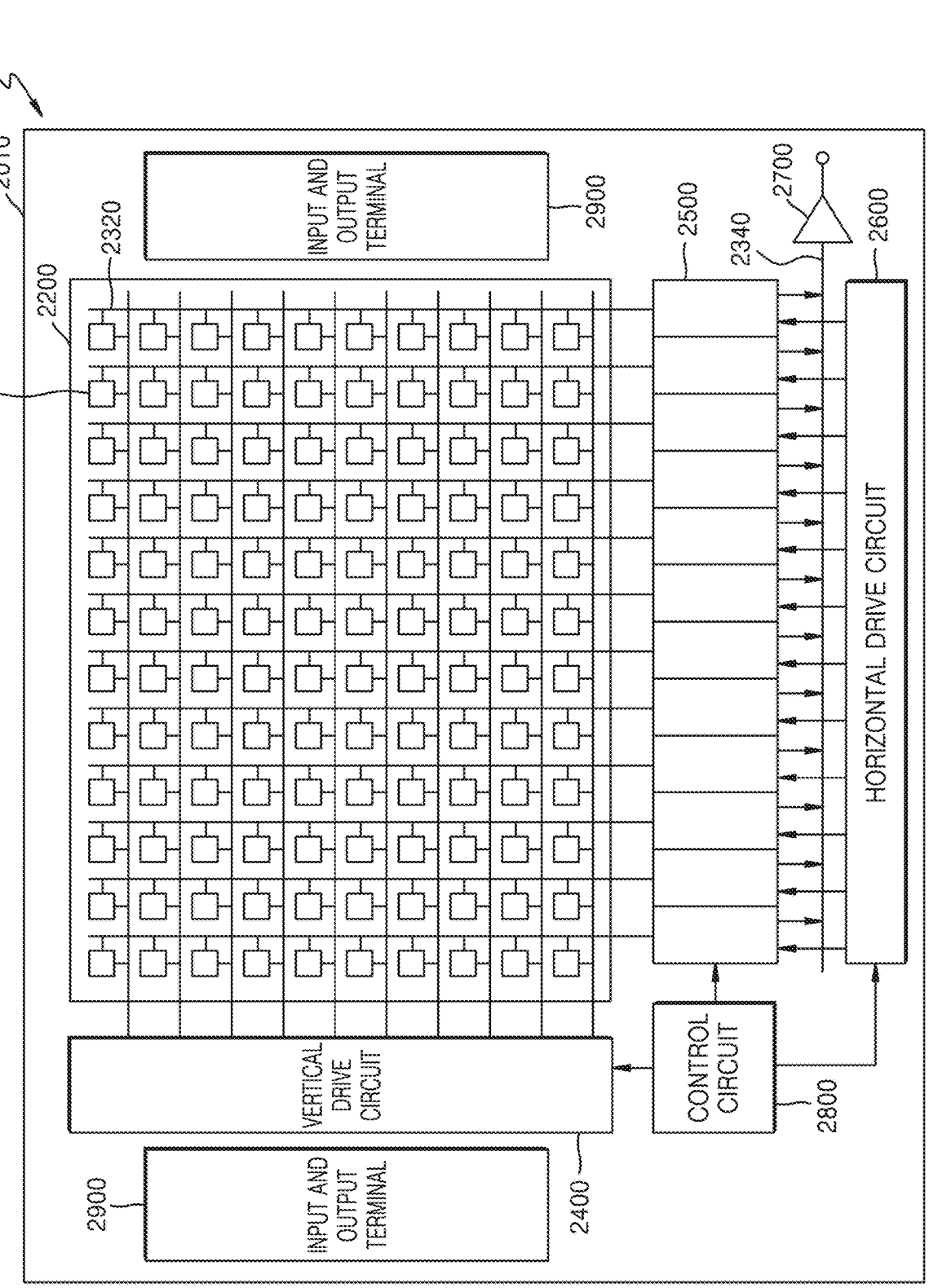
FIG. 12 is a block diagram illustrating an image sensor chip included in an image sensor package, according to one or more embodiments.

FIG. 12 is a block diagram illustrating an image sensor chip included in an image sensor package, according to one or more embodiments.

Referring to FIG. 12, an image sensor chip 2000 may include a pixel unit 2200 and a peripheral circuit unit. The pixel unit 2200 may be formed by regularly arranging, in a two-dimensional array structure on a substrate 2010, a plurality of pixels 2100 including photoelectric conversion layers. The image sensor chip 2000 may be the image sensor chip 200 described above with reference to FIGS. 1A through 10.

The peripheral circuit unit may be arranged around the pixel unit 2200, and may include a vertical drive circuit 2400, a column signal processing circuit 2500, a horizontal drive circuit 2600, an output circuit 2700, a control circuit 2800, and the like.

The control circuit 2800 may control the vertical drive circuit 2400, the column signal processing circuit 2500, the horizontal drive circuit 2600, and the like. For example, the control circuit 2800 may generate a clock signal or control signals, which serve as a reference for operations of the vertical drive circuit 2400, the column signal processing circuit 2500, the horizontal drive circuit 2600, and the like, on the basis of a vertical synchronization signal, a horizontal synchronization signal, and a master clock. In addition, the control circuit 2800 may input the clock signal or the control signals into the vertical drive circuit 2400, the column signal processing circuit 2500, the horizontal drive circuit 2600, and the like.

The vertical drive circuit 2400 may include, for example, a shift register, which selects a pixel drive line, and supplies the selected pixel drive line with a pulse for driving a pixel to drive pixels in a row unit. For example, the vertical drive circuit 2400 may sequentially selectively scan the respective pixels 2100 of the pixel unit 2200 with pulses in a vertical direction in a row unit. Also, the vertical drive circuit 2400 may allow a pixel signal according to charges generated by the photoelectric conversion layer of each pixel 2100 to be supplied to the column signal processing circuit 2500 via a vertical signal line 2320.

The column signal processing circuit 2500 may be arranged for each column of the pixels 2100, and may perform, for each pixel column, signal processing such as noise removal, on a signal output from the pixels 2100 for one row. For example, the column signal processing circuit 2500 may perform signal processing such as correlated-double sampling (CDS), signal amplification, or AD conversion for removing unique noise of the pixels 2100. The column signal processing circuit 2500 may have an output terminal at which a horizontal selection switch (not shown) may be installed.

The horizontal drive circuit 2600 may include, for example, a shift register, which sequentially selects the respective column signal processing circuits 2500 by sequentially outputting horizontal scan pulses, and outputting a pixel signal of each of the column signal processing circuits 2500 to a horizontal signal line 2340.

The output circuit 2700 may perform signal processing on signals sequentially supplied from the respective column signal processing circuits 2500 via the horizontal signal line 2340, and output the signal-processed signals. For example, the output circuit 2700 may perform only buffering, or may perform black level adjustment, thermal non-uniformity correction, various types of digital signal processing, and the like. Meanwhile, an input and output terminal 2900 may exchange signals with the outside.

While the inventive concepts have been particularly shown and described with reference to embodiments thereof, it will be understood that various changes in form and details may be made therein without departing from the spirit and scope of the following claims.

What is claimed is:

1. An image sensor package comprising:
a package base substrate having a cavity that extends inwards from an upper surface thereof, and the package base substrate including a plurality of upper surface connection pads and a plurality of lower surface connection pads electrically connected to each other;
an image sensor chip in the cavity, and the image sensor chip including a chip body having a first surface and a second surface that face away from each other, a sensor unit in the first surface of the chip body, and a plurality of chip pads around the sensor unit in the first surface of the chip body;
a filter glass above the image sensor chip, and the filter glass including a transparent substrate and a plurality of redistribution patterns on a lower surface of the transparent substrate;
a plurality of connection terminals between the plurality of redistribution patterns and the plurality of chip pads, and between the plurality of redistribution patterns and the plurality of upper surface connection pads to electrically connect the plurality of chip pads to the plurality of upper surface connection pads;
an encapsulant configured to fill a space between the package base substrate and the filter glass, and surround the plurality of connection terminals; and
a dam structure between the chip body and the transparent substrate and between the sensor unit and the encapsulant.

2. The image sensor package of claim 1, wherein the dam structure has a rectangular ring shape that continuously extends along an edge of the sensor unit, planarly between the sensor unit and the plurality of chip pads, and defines an inner space together with the image sensor chip and the filter glass.

3. The image sensor package of claim 2, wherein the encapsulant fills the space between the package base substrate and the filter glass, planarly on an outside of the dam structure, and is free from an inner space of the dam structure.

4. The image sensor package of claim 1, wherein the image sensor chip is spaced apart from an inner side of the cavity of the package base substrate, and attached to a bottom surface of the cavity of the package base substrate via a chip adhesive member attached to the second surface of the chip body.

5. The image sensor package of claim 4, wherein the encapsulant fills a space between the image sensor chip and the inner side of the cavity.

6. The image sensor package of claim 1, wherein an upper surface of the package base substrate and the first surface of the chip body are at a same vertical level.

7. The image sensor package of claim 1, wherein an upper surface of the package base substrate is at a first vertical level, and the first surface of the chip body is at a second vertical level that is higher than the first vertical level.

8. The image sensor package of claim 1, wherein the plurality of connection terminals include a plurality of inner connection terminals attached to the plurality of chip pads, and the plurality of connection terminals include a plurality of outer connection terminals attached to the plurality of upper surface connection pads, and at least one of a horizontal width and a vertical height of the plurality of outer connection terminals is greater than a respective one of a horizontal width and a vertical height of the plurality of inner connection terminals.

9. An image sensor package comprising:
a package base substrate having a cavity in an upper surface thereof, and the package base substrate including a plurality of upper surface connection pads and a plurality of lower surface connection pads electrically connected to each other;
an image sensor chip in the cavity, and the image sensor chip including a chip body having a first surface and a second surface that face away from each other, a sensor unit in the first surface of the chip body, and a plurality of chip pads around the sensor unit in the first surface of the chip body;
a filter glass above the image sensor chip, and the filter glass including a transparent substrate and a plurality of redistribution patterns, and the plurality of redistribution patterns on a lower surface of the transparent substrate, planarly adjacent to an edge of the transparent substrate, and that extend from an inner location to an outer location;
a plurality of inner connection terminals between the plurality of redistribution patterns and the plurality of chip pads;
a plurality of outer connection terminals between the plurality of redistribution patterns and the plurality of upper surface connection pads;
a dam structure between the chip body and the transparent substrate and between and spaced from the sensor unit and the inner connection terminals; and
an encapsulant configured to fill a space between the package base substrate and the filter glass, planarly on the outside of the dam structure, and surround the plurality of inner connection terminals and the plurality of outer connection terminals, wherein the image sensor chip is electrically connected to the plurality of lower surface connection pads via the plurality of chip pads, the plurality of inner connection terminals, the plurality of redistribution patterns, the plurality of outer connection terminals, and the plurality of upper surface connection pads.

10. The image sensor package of claim 9, wherein the filter glass further includes a light shielding film having an opening, the light shielding film covers an edge portion of an upper surface of the transparent substrate, and reveals a central portion of the upper surface of the transparent substrate.

11. The image sensor package of claim 10, wherein the light shielding film does not overlap the sensor unit in a vertical direction.

12. The image sensor package of claim 10, wherein the light shielding film overlaps the plurality of redistribution patterns and the dam structure in a vertical direction.

13. The image sensor package of claim 9, wherein the plurality of redistribution patterns each include an inner pad to which one of the plurality of inner connection terminals is attached, an outer pad to which one of the plurality of outer connection terminals is attached, and a connection line that connects the inner pad to the outer pad, wherein the inner pad, the outer pad, and the connection line form an integral body.

14. The image sensor package of claim 13, wherein a horizontal width of each of the inner pad and the outer pad is greater than a line width of the connection line.

15. The image sensor package of claim 9, wherein the encapsulant fills the cavity, and does not fill an inner space defined by the dam structure, the image sensor chip, and the filter glass.

16. A system comprising:
a housing having a light incidence opening;
a system board within the housing;
an image sensor package attached onto the system board within the housing; and
an optical unit coupled to the light incidence opening of the housing, and including a barrel and at least one lens supported by the barrel, wherein
the image sensor package comprises:
a package base substrate including a plurality of upper surface connection pads and a plurality of lower surface connection pads electrically connected to each other, and the package base substrate having a cavity that extends inwards from an upper surface thereof and does not extend to a lower surface thereof;
an image sensor chip in the cavity, and the image sensor chip including a chip body having a first surface and a second surface that face away from each other, a sensor unit in the first surface of the chip body, and a plurality of chip pads around the sensor unit in the first surface of the chip body;
a filter glass including a transparent substrate, a light shielding film that covers a portion of an upper surface of the transparent substrate, and a plurality of redistribution patterns on a lower surface of the transparent substrate, each of the plurality of redistribution patterns including an inner pad, an outer pad, and a connection line that connects the inner pad to the outer pad, planarly adjacent to an edge of the transparent substrate, and extends from the inside to the outside, wherein the inner pad, the outer pad, and the connection line form an integral body;
a plurality of inner connection terminals between the inner pads of the plurality of redistribution patterns and the plurality of chip pads;
a plurality of outer connection terminals between the outer pads of the plurality of redistribution patterns and the plurality of upper surface connection pads;
a dam structure between the chip body and the transparent substrate, that continuously extends planarly between the sensor unit and the plurality of chip pads, and fully surrounds the sensor unit, the dam structure and the sensor unit being spaced apart from each other in a horizontal direction; and
an encapsulant that surrounds the plurality of inner connection terminals and the plurality of outer connection terminals, fills the cavity and a space between the package base substrate and the filter glass, planarly on the outside of the dam structure, and not within an inner space defined by the dam structure, the image sensor chip, and the filter glass.

17. The system of claim 16, wherein an edge of an opening of the light shielding film is between the dam structure and the sensor unit in a vertical direction, such that the light shielding film overlaps the plurality of redistribution patterns and the dam structure in the vertical direction and does not overlap the sensor unit.

18. The system of claim 17, wherein the dam structure and the sensor unit are spaced apart from each other by about 100 µm to about 300 µm in the horizontal direction, and the connection line has a line width of about 30 µm to about 70 µm.

\* \* \* \* \*